(12) United States Patent
Lindley et al.

(10) Patent No.: US 11,993,459 B2
(45) Date of Patent: *May 28, 2024

(54) STORAGE AND PICKING SYSTEM AND PICKING METHOD WITH IMPROVED GOODS TRANSFER BETWEEN TWO STORAGE LOCATIONS

(71) Applicant: TGW Logistics Group GmbH, Marchtrenk (AT)

(72) Inventors: Timothy Lindley, Schwerte (DE); Gerald Kettlgruber, Linz (AT); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 812 days.

This patent is subject to a terminal disclaimer.

(21) Appl. No.: 17/253,181

(22) PCT Filed: Jun. 19, 2019

(86) PCT No.: PCT/AT2019/060204
§ 371 (c)(1),
(2) Date: Dec. 17, 2020

(87) PCT Pub. No.: WO2019/241817
PCT Pub. Date: Dec. 26, 2019

(65) Prior Publication Data
US 2021/0261333 A1 Aug. 26, 2021

(30) Foreign Application Priority Data

Jun. 21, 2018 (AT) .............................. A 50515/2018

(51) Int. Cl.
*B65G 1/137* (2006.01)
*B65G 1/04* (2006.01)
(Continued)

(52) U.S. Cl.
CPC ......... *B65G 1/1373* (2013.01); *B65G 1/0457* (2013.01); *B66F 9/063* (2013.01); *G06Q 10/087* (2013.01)

(58) Field of Classification Search
CPC .. B65G 1/1378; B65G 1/0457; B65G 1/1373; B65G 1/1376; B65G 1/0492; B65G 1/10;
(Continued)

(56) References Cited

U.S. PATENT DOCUMENTS 5,720,157 A 2/1998 Ross
6,580,046 B1 6/2003 Koini et al.
(Continued)

FOREIGN PATENT DOCUMENTS

AT 516 612 B1 7/2016
AT 520517 A4 5/2019
(Continued)

OTHER PUBLICATIONS

International Search Report in PCT/AT2019/060203, mailed Nov. 12, 2019.
(Continued)

*Primary Examiner* — Timothy R Waggoner
(74) *Attorney, Agent, or Firm* — Collard & Roe, P.C.

(57) ABSTRACT

In an order-picking method for picking at least one ordered good into or onto a target loading aid, goods which are stored in a first storage zone using first loading aids are reloaded, on the basis of a transfer request, from a first loading aid into at least one hanging bag and stored in a second storage zone. When a picking order is obtained, (an) ordered good(s) is/are retrieved from the second storage zone and loaded into or onto the target loading aid. The transfer request is generated and executed without reference to a picking order. Further, a storage and order-picking system carries out the method.

36 Claims, 3 Drawing Sheets

(51) Int. Cl.
*B66F 9/06* (2006.01)
*G06Q 10/087* (2023.01)

(58) Field of Classification Search
CPC ........ B65G 1/06; G06Q 10/087; G06Q 10/08; G06Q 50/28
See application file for complete search history.

(56) References Cited

U.S. PATENT DOCUMENTS

| | | |
|---|---|---|
| 7,084,769 B2 | 8/2006 | Bauer et al. |
| 8,170,712 B2 | 5/2012 | Battles et al. |
| 8,538,578 B2 | 9/2013 | Battles et al. |
| 8,583,490 B2 | 11/2013 | Klementowicz, III |
| 9,014,843 B2 | 4/2015 | Winkler |
| 9,205,982 B2 | 12/2015 | Winkler |
| 9,421,580 B2 | 8/2016 | Hansl et al. |
| 9,760,086 B2 | 9/2017 | Woodtli et al. |
| 9,828,182 B2 | 11/2017 | Schoenenberger |
| 9,975,699 B2 | 5/2018 | Yamashita |
| 9,988,212 B2 | 6/2018 | Yamashita |
| 10,083,406 B2 * | 9/2018 | Hance .................. G06Q 10/087 |
| 10,252,861 B2 | 4/2019 | Mathi et al. |
| 10,252,862 B2 | 4/2019 | Mathi et al. |
| 10,354,221 B2 | 7/2019 | Winkler |
| 10,427,873 B1 | 10/2019 | Mause et al. |
| 10,710,802 B2 | 7/2020 | Grosse et al. |
| 11,453,555 B2 * | 9/2022 | Lindley ................ B65G 1/1378 |
| 2008/0056864 A1 | 3/2008 | Wada et al. |
| 2008/0270327 A1 | 10/2008 | Freudelsperger |
| 2009/0136328 A1 | 5/2009 | Schafer |
| 2010/0049635 A1 | 2/2010 | Delaney et al. |
| 2012/0097064 A1 | 4/2012 | Küssner |
| 2012/0213617 A1 | 8/2012 | Winkler |
| 2014/0100769 A1 * | 4/2014 | Wurman .............. G06Q 10/087 705/22 |
| 2017/0291767 A1 | 10/2017 | Shields et al. |
| 2018/0025460 A1 | 1/2018 | Watanabe et al. |
| 2018/0137459 A1 | 5/2018 | Jacobs et al. |
| 2018/0194556 A1 * | 7/2018 | Lert, Jr. ............... G06Q 10/087 |
| 2018/0251303 A1 * | 9/2018 | Mathi .................... B65G 17/20 |
| 2019/0047787 A1 * | 2/2019 | Fosnight ............... B66C 1/445 |
| 2019/0108604 A1 | 4/2019 | Friedl et al. |
| 2019/0177086 A1 * | 6/2019 | Mathi ...................... B65G 1/10 |
| 2020/0024074 A1 | 1/2020 | Herzog-Lang et al. |
| 2021/0395012 A1 | 12/2021 | Liu et al. |
| 2022/0374836 A1 | 11/2022 | Miyamoto et al. |

FOREIGN PATENT DOCUMENTS

| | | |
|---|---|---|
| AU | 1998071492 A1 | 11/1998 |
| AU | 2012207033 A1 | 2/2013 |
| CA | 3 096 726 A1 | 10/2019 |
| CN | 101134528 A | 3/2008 |
| CN | 101957904 A | 1/2011 |
| CN | 103738646 A | 4/2014 |
| CN | 103764523 A | 4/2014 |
| CN | 104169197 A | 11/2014 |
| CN | 105392719 A | 3/2016 |
| CN | 105473469 A | 4/2016 |
| CN | 106815698 A | 6/2017 |
| CN | 107408285 A | 11/2017 |
| CN | 207434315 U | 6/2018 |
| DE | 20 2009 009 774 U1 | 9/2009 |
| DE | 10 2010 010 433 A1 | 9/2011 |
| DE | 10 2011 104 511 B3 | 10/2012 |
| DE | 10 2011 103 194 A1 | 12/2012 |
| DE | 10 2011 106 667 A1 | 1/2013 |
| DE | 10 2011 116 081 B3 | 4/2013 |
| DE | 10 2013 101 659 A1 | 8/2013 |
| DE | 10 2013 103 869 A1 | 10/2014 |
| DE | 10 2014 111 396 A1 | 2/2016 |
| DE | 10 2014 115 579 A1 | 4/2016 |
| DE | 20 2015 003 612 U1 | 8/2016 |
| DE | 20 2017 106 993 U1 | 12/2017 |
| DE | 20 2017 100 206 U1 | 4/2018 |
| EP | 0 798 239 A2 | 10/1997 |
| EP | 2 354 047 A1 | 8/2011 |
| EP | 2467319 B1 | 6/2012 |
| EP | 2 581 329 B1 | 7/2014 |
| EP | 2 769 936 A1 | 8/2014 |
| EP | 2 964 549 B1 | 9/2016 |
| EP | 2 766 285 B1 | 4/2017 |
| EP | 3 110 726 B1 | 4/2020 |
| EP | 3 575 246 B1 | 12/2022 |
| JP | 2001253515 A | 9/2001 |
| WO | 2006/029433 A1 | 3/2006 |
| WO | 2012/163780 A1 | 12/2012 |
| WO | 2013/004712 A1 | 1/2013 |
| WO | 2016/033628 A1 | 3/2016 |
| WO | 2017/027896 A1 | 2/2017 |
| WO | 2017/027897 A1 | 2/2017 |
| WO | 2017/100170 A1 | 6/2017 |
| WO | 2017/190168 A1 | 11/2017 |
| WO | 2017/214652 A1 | 12/2017 |
| WO | 2018/092015 A1 | 5/2018 |

OTHER PUBLICATIONS

International Search Report in PCT/AT2019/060241, mailed Dec. 6, 2019.
International Search Report in PCT/AT2019/060204, mailed Oct. 24, 2019.
International Search Report in PCT/AT2019/060202, mailed Oct. 24, 2019.
Link to YouTube-Video from Knapp AG "How to shop your elephant": https://www.youtube.com/watch?v=nU9UV8z3ap0, 72 pages, downloaded Nov. 10, 2020.
SSI Carrier, The highly dynamic pocket sorter system for e-commerce and omnichannel, 10 pages, with English translation, downloaded Nov. 20, 2020.
SSI Schaefer, SSI Carrier: Das hochdynamische Taschensorter-System fuer E-Commerce und Omnichannel, https://www.youtube.com/watch?v=ASYRjuTOJ-U, 50 pages, downloaded Nov. 17, 2020.
"Flat goods and goods on hangers for store delivery and eCommerce, Stockmann", published by SSI Schaefer Group on Jan. 30, 2018, available at: https://www.youtube.com/watch?v=5U0TDpt1WAU.
"Overhead Conveying System, Fashion Logistics, eCommerce, Order Mail, Returns Processing, Loxxess AG", published by SSI Schaefer Group on Feb. 20, 2015 available at: https://www.youtube.com/watch?v=bl7X9MiiuWA.
"E-commerce solution with pocket sorter and robot workstation", Online article published by Telematic Markt.DE on May 22, 2014 with translation.
"Hautnah fashion solutions", brochure published by Knapp AG in May 2014 and distributed at Knapp AG exhibition stand during CeMat trade fair in May 2014 with translation and description of relevant portion.
Photograph of Knapp AG exhibition stand at CeMat trade fair in May 2014 with description.
Opposition to European Patent EP 3810530 dated Mar. 7, 2024 with translation.

* cited by examiner

STORAGE AND PICKING SYSTEM AND PICKING METHOD WITH IMPROVED GOODS TRANSFER BETWEEN TWO STORAGE LOCATIONS

CROSS REFERENCE TO RELATED APPLICATIONS

This application is the National Stage of PCT/AT2019/060204 filed on Jun. 19, 2019, which claims priority under 35 U.S.C. § 119 of Austrian Application No. A 50515/2018 filed on Jun. 21, 2018, the disclosure of which is incorporated by reference. The international application under PCT article 21(2) was not published in English.

BACKGROUND OF THE INVENTION

1. Field of the Invention

The invention relates to an order-picking method for picking at least one ordered good into or onto a target loading aid. In this process, goods of different types of good are stored into a first storage zone using first loading aids, which respectively receive a plurality of goods and which are respectively configured so as to be different from a hanging bag. Further, a transfer request for rearranging multiple transfer goods of a type of good from the first storage zone into a second storage zone when the goods of this type of good are low in stock in the second storage zone is generated. On the basis of the transfer request, the transfer goods are reloaded from a first loading aid into at least one second loading aid, which is configured as a hanging bag or comprises such a hanging bag, and the at least one second loading aid is transported into the second storage zone. In another step, a picking order for picking the at least one ordered good is obtained, and the at least one ordered good required for this picking order is ascertained. On the basis of the picking order, the at least one ordered good is retrieved from the second storage zone and loaded into or onto the target loading aid.

Further, the invention relates to a storage and order-picking system for picking at least one ordered good into or onto a target loading aid, which comprises a first storage zone for storing goods of different types of good using first loading aids, in which a plurality of goods are respectively receivable and which are respectively configured so as to be different from a hanging bag. Further, the storage and order-picking system comprises a second storage zone for storing the goods of different types of good using second loading aids, which are respectively configured as a hanging bag or comprise such a hanging bag, as well as a warehouse computer for generating a transfer request for rearranging multiple transfer goods of a type of good from the first storage zone into the second storage zone when the goods of this type of good are low in stock in the second storage zone. Furthermore, the storage and order-picking system comprises a first conveying system for retrieving the first loading aids with the transfer goods from the first storage zone on the basis of the transfer request and a second conveying system for storing the hanging bags with the transfer goods into the second storage zone on the basis of the transfer request and for retrieving at least one ordered good. In addition, the storage and order-picking system comprises a reloading station cooperating with the first conveying system and the second conveying system and which enables the reloading, on the basis of the transfer request, of the transfer goods from a first loading aid into a hanging bag provisioned at the reloading station. Further, the storage and order-picking system comprises an order-processing computer for receiving an order for picking at least one ordered good and for ascertaining the ordered good(s) required for this picking order. Finally, the storage and order-picking system comprises a picking station cooperating with the second conveying system and which enables the reloading, on the basis of the picking order, of the at least one ordered good from a hanging bag into or onto a target loading aid provisioned at the picking station.

2. Description of the Related Art

Such methods and storage and order-picking systems are known, in principle, from the prior art. It is disadvantageous here that the transfer processes and the picking processes highly and/or directly depend on one another. A picking process entails, at all times, a transfer process, which effects the reloading of the ordered good(s) removed from the second storage zone. In this way, a quasi-constant stock of goods in the second storage zone is achieved at all times. However, this results in a high strain on the first conveying system in the first storage zone, in the worst case in blockades and a quasi-standstill in the first storage zone. This may happen in particular when (a) (new) good(s) is/are stored into the first storage zone, and there is therefore only limited capacity for the execution of the transfer processes.

SUMMARY OF THE INVENTION

It is therefore an object of the invention to specify an improved order-picking method and an improved storage and order-picking system. In particular, the complexity in terms of control technology in the storage and order-picking system, undue strain on the first conveying system in the first storage zone as well as blockades and quasi-standstills in the first storage zone are to be avoided.

The object of the invention is achieved with an order-picking method of the kind mentioned at the beginning, in which the transfer request is generated and executed without reference to a picking order.

Advantageously, the first loading aid is conveyed, in this process, with the transfer goods, on the basis of the transfer request, from the first storage zone to a reloading station and provisioned at a first reloading provisioning position of the reloading station. Afterwards, the transfer goods are reloaded into at least one hanging bag, which is provisioned at a second reloading provisioning position of the reloading station.

Here, the steps of the specified method can run in an automatic and/or automated manner. In particular, all steps of the specified method can run in an automatic and/or automated manner.

The object of the invention is also achieved with a storage and order-picking system of the kind mentioned at the beginning in which the warehouse computer is configured to generate and execute the transfer request without reference to a picking order.

In other words, the warehouse computer and the order-processing computer can work independent of each other in terms of control technology and/or the transfer processes and the picking processes can run independent of one another in terms of control technology. The decoupling of these processes ensures that the complexity in terms of control technology can be advantageously decreased in the storage and order-picking system. It should be noted in this context that "independent in terms of control technology"

does not mean "uninfluenced," as the generation of a transfer request is, after all, influenced via the stock of the good(s) in the second storage zone. Therefore, the generation of a transfer request is influenced also indirectly by the picking processes, which, in turn, affect the stock of the good(s) in the second storage zone, after all. Yet not every picking order results necessarily and directly in a transfer request. This ensures that the strain on the first conveying system in the first storage zone is reduced and blockades and quasi-standstills in the first storage zone are avoided. Therefore, storing of (a) (new) good(s) into the first storage zone can be done parallel, or quasi-parallel, to the transfer processes.

In the storage and order-picking system proposed, the first loading aid is additionally structured differently from the second loading aid. In this way, the first loading aids provided for the first storage zone can be easily used for the longer-term storing of goods, whereas the second loading aids (hanging bag) provided in the second storage zone can be easily used for the rather short-term storing of goods. In addition, the hanging bag helps to execute the picking process efficiently and swiftly.

It is advantageous if the first loading aid, during the execution of a transfer request, is fully or partially unloaded (and after the execution of a transfer request is in a fully or partially unloaded state), depending on whether a parameter which is allocated to a type of good reaches (and/or falls below or rises above) a threshold value.

Accordingly, the fact that a first loading aid is fully or partially unloaded during the execution of a transfer execution does not depend on whether the same number of goods are coincidentally stored in the first loading aid as were requested by the transfer request, or more goods than were requested using the transfer request, but on whether or not said threshold value is reached. Accordingly, a possible return conveying back into the first storage zone of a remaining quantity of goods remaining in the first loading aid equally does not depend on whether the same number of goods are coincidentally stored in the first loading aid as were requested by the transfer request, or more goods than were requested by the transfer request. Rather, the full unloading of the first loading aid and a return storing back into the first storage zone of a remaining quantity of goods remaining in the first loading aid associated with it, if applicable, is done in a deterministic manner. The processes running between the first storage zone and the second storage zone are therefore easier to plan and foresee than this is the case in the prior art.

In particular, a probability P for a full unloading of the first loading aid (or a group of first loading aids, e.g. a group which is involved in a transfer request) fits the constraint $$P > \frac{1}{n_{Waren}}$$

wherein $n_{Waren}$ specifies the number of goods being stored in or on this (these) first loading aid(s).

In more general terms, this means $$P > \frac{k}{n_{Waren}} \quad k \geq 1 \quad (\text{e.g. } k = 1.1)$$

therefore, for example:

$$P > \frac{1,1}{n_{Waren}}$$

The above constraints describe a full unloading of the first loading aid that is targeted and not dependent on coincidence. Here, the parameter k specifies the degree of the full unloading of the first loading aid that is targeted and not dependent on coincidence.

It is also advantageous if a probability P for a full unloading of the first loading aids that are used for storing the line of goods fits the constraint $$P > \frac{n_{LHM1}}{n_{Waren}}$$

wherein $n_{LHM1}$ specifies the number of first loading aids used for storing the line of goods and $n_{Waren}$ the number of goods being stored in or on these first loading aids.

In more general terms, this means:

$$P > k \cdot \frac{n_{LHM1}}{n_{Waren}} \quad k \geq 1 \quad (\text{e.g. } k = 1.1)$$

wherein the parameter k specifies, once again, the degree of the full unloading of the first loading aid that is targeted and not dependent on coincidence.

It is further advantageous if a probability P for a full unloading of the first loading aid fits the constraint $$\frac{n_{LHM1vollst}}{n_{LHM1}} > k \cdot \frac{n_{LHM1}}{n_{Waren}} \quad k \geq 1 \quad (\text{e.g. } k = 1.1)$$

wherein $n_{LHM1vollst}$ specifies the number of fully unloaded first loading aids (in a period of time t), $n_{LHM1}$ the number of first loading aids involved in a transfer request (in this period of time t) and $n_{Waren}$ the number of goods being stored in or on these first loading aids involved in a transfer request (in this period of time t). In this variant embodiment, reference is made to the reloading point (i.e. to the reloading station) and/or to the reloading operations actually performed. The period of time t should be selected to be sufficiently long, e.g. t=1 h or t=1 day.

Generally, goods in a "storage and order-picking system" may be delivered and accepted at a goods-in area, for example, and thereafter, if applicable, repacked and stored in a warehouse. The goods may also be picked in accordance with an order, i.e. retrieved from the warehouse, compiled into an order and provisioned for outbound transport at the goods-out area. In marked contrast to a manufacturing process, the goods are not substantially changed between goods-in area and goods-out area. Yet a small change in shape is possible, in particular in case of non-rigid bodies, such as pouches or bags, or in case of other yielding packaging made of cardboard or plastic, for example.

"Goods" are generally objects of the trade in goods and are delivered at the goods acceptance zone and discharged to a customer at the goods transfer zone in accordance with an order. Goods which are allocated to an order are referred to within the scope of the invention as "ordered goods." The allocation to an order can be done for goods already in storage or, in principle, even before.

"Transfer goods" are goods which are to be transferred in accordance with a transfer request from the first storage zone into the second storage zone and/or are actually transferred from the first storage zone into the second storage zone.

Within the scope of the invention, (a) "good(s)," "transfer good(s)" or (an) "ordered good(s)" is/are understood to mean, in particular, an individually-handleable object and/or an individually-handleable group of objects.

It should generally be noted that (a) "good(s)," (an) "ordered good(s)" and a "transfer good(s)" may be one and the same object at different points in time.

A "type of good" specifies the kind of (a) good(s). For example, "tagliatelle, 1 kg" or "mineral water 1 l" may be provided as the type of good. The type of good may in particular also comprise items of clothing. For example, "shirt, white, size 42" or "jeans, size 34/34" or "sock, black, size 43" may be provided as the type of good.

A "line of goods available" corresponds to the totality of the types of good stored in the first storage zone.

A "transfer request" or "rearrangement request" is a request or instruction to transfer multiple transfer goods of a type of good from the first storage zone into the second storage zone. Such a transfer or rearrangement request is generated when the goods of this type of good are low in stock in the second storage zone. In particular, the goods of this type of good are low in stock in the second storage zone whenever the number of the goods of this type of good stored in the second storage zone falls below a threshold value.

A "warehouse computer" serves to monitor the stock of the goods in the second storage zone and generates a transfer or rearrangement request when (a) good(s) of a specific type of good is low in stock in the second storage zone.

Within the scope of the invention, "rearranging" means the retrieving of (a) transfer good(s) from the first storage zone and the storing of this/these transfer good(s) into the second storage zone.

A "provisioning time during the retrieving of (a) transfer good(s) from the first storage zone" is a measure for the period of time which elapses from the request to retrieve (a) transfer good(s) from the first storage zone to the point in time at which the respective transfer good(s) is/are actually provisioned at the reloading station.

An "order for picking ordered goods" ("picking order" in short) specifies the goods requested by a customer, at least with regard to number and type of good. For example, a picking order may comprise multiple order lines, which respectively contain the number and the type of good of (a) good(s) requested by the customer.

An "order-processing computer" serves to acquire an order and to execute same. For this purpose, the order-processing computer is in particular connected, in terms of control technology, to elements of the storage and order-picking system, in particular to the first and/or second conveying system of the storage and order-picking system. The warehouse computer and the order-processing computer may also be configured as a warehouse and order-processing computer. In this case, the warehouse computer can be configured as a warehouse control unit and the order-processing computer as an order control unit. The warehouse control unit and/or order control unit can in particular be a part of a software which runs in a warehouse and order-processing computer, i.e. a subroutine, for example.

Within the scope of the invention, "picking" is to be understood to mean the compiling of ordered goods for a picking order, in the narrower sense the loading of a target loading aid with the ordered good(s).

"Slow-moving goods" are goods/ordered goods with a low rate of turnover and/or ordered goods which appear statistically less frequently in orders (picking orders) and are therefore not requested as often as fast-moving consumer goods.

"Fast-moving goods" are goods/ordered goods with a high rate of turnover and/or ordered goods which appear statistically frequently in orders (picking orders).

"Article-specific" means that the goods, or ordered goods, stored in a loading aid have the same type of good. For example, a loading aid contains the good(s)/ordered good(s) "A" and another loading aid contains the good(s)/ordered good(s) "B" etc. On the other hand, the loading aids may be subdivided into multiple receiving compartments by separating walls and receive different types of good, wherein (a) good(s)/ordered good(s) "A" may be received in the first receiving compartment and (a) good(s)/ordered good(s) "B" may be received in the second receiving compartment. The goods, or ordered goods, stored in a storage zone or in a loading aid in a "mixed", or "non-article-specific," manner, in contrast, have different types of good.

A "storage location" is an area in the storage and order-picking system in which (a) good(s) can be stored. A "storage zone" is an area in the storage and order-picking system which has a plurality of storage locations for storing the goods. For example, the storage zone may be configured as a fixed-installation or mobile storage rack which provisions a plurality of storage locations next to one another and on top of one another. Yet it is also conceivable that the storage zone is an area at the floor of the storage and order-picking system, which is provided and/or reserved for depositing and storing (a) good(s). Walk and travel zones are therefore not storage zones but may adjoin to same.

The "first storage zone" serves to store the first loading aids. In particular, only first loading aids, and no hanging bags, are stored there. For example, the first storage zone may be formed by shelf units and/or or by other holding spaces for the first loading aids, in particular by holding spaces at the floor. Automated conveying vehicles may be provided in the first storage zone for storing and retrieving first loading aids. A possible embodiment of such a first storage zone with storage locations and a first conveying system is known, for example, from WO 2016/033628 A1.

The "second storage zone" serves to store the hanging bags. In particular, only hanging bags, and no first loading aids, are stored there. For example, the second storage zone may be formed by overhead storage conveyors for the hanging bags.

A "goods transfer zone" is to be understood to mean the area in which ordered goods are discharged from the storage and order-picking system, i.e. in particular a goods-out area.

A "goods acceptance zone" is to be understood to mean the area in which goods are introduced into the storage and order-picking system, i.e. in particular a goods-in point. In particular, goods carriers (e.g. pallets, cardboard boxes, etc.) which have been delivered can be separated in a manual or automated manner. This procedure is also referred to as "depalletizing."

A "target loading aid" serves to receive the ordered goods during the picking process and may in particular be configured as a container, cardboard box, tray, pallet, bag (in particular a "polybag"), pouch, sack, hanging bag, suspended carrier or shelf unit. The target loading aid can be used in particular as a "dispatch loading aid" and serve to transport ordered goods out of the storage and order-picking system. Yet the target loading aid can also be used as an "interim loading aid," in or on which ordered goods that have been picked and are intended for dispatching are interim-stored before being reloaded into or onto a dispatch loading aid.

A "first loading aid" serves to transport goods and/or transfer goods to, in and from the first storage zone. A first loading aid is configured so as to be different from a hanging bag (and, if applicable, different from a suspended carrier) and has, in particular, one, or multiple, of the following properties:

- A first loading aid is stored in the first storage zone standing upright or lying down and transported on the first conveying system standing upright or lying down. Yet it would also be conceivable, in principle, that a container-shaped loading aid is transported suspended from an edge on container walls.
- A first loading aid in the operating position has a width, depth and height, wherein the following constraint is met:

width+depth>2·height.

- A first loading aid is configured as a container, cardboard box, tray, pallet or shelf unit.
- A first loading aid has a rigid bottom and/or rigid walls with an elastic modulus>100 MPa.
- A transport surface, at which the first loading aid is in contact with the first storage zone or with the first conveying system, in the operating position of the first loading aid is arranged below the receiving plane and/or loading plane of the first loading aid.
- A first loading aid may be configured without a hook and is then hookless and/or hook-free.

It should be noted in this context that not all first loading aids must have the same properties, but first loading aids may also be configured differently. In addition, first loading aids may have multiple receiving zones/receiving compartments.

The second loading aid (the hanging bag) may in particular have one, or multiple, of the following properties:

- A hanging bag is stored in the second storage zone suspended and is transported on the second conveying system suspended.
- A hanging bag in a suspended state (operating position) has a width, depth and height, wherein the following constraint is met:

width+depth<2·height.

- A hanging bag has a bottom and/or walls made of flexible material, preferably of a textile (textile fabric) or a foil (plastic foil).
- A supporting surface, at which the hanging bag is in contact with the second storage zone, or with the second conveying system, has a hook shape or bracket shape.
- A supporting surface, at which the hanging bag is in contact with the second storage zone, or with the second conveying system, is configured roller-shaped and connected with a hook or arm of the hanging bag.
- A supporting surface, at which the hanging bag is in contact with the second storage zone, or with the second conveying system, in the operating position of the hanging bag is arranged above the filling plane of the hanging bag.

In particular, a hanging bag comprises a front wall, a rear wall, a bottom, a storing space limited by the front wall, the rear wall and the bottom and a loading opening and/or unloading opening configured at the hanging bag at a first side and limited by the front wall, the rear wall and the bottom. The hanging bag may at a second side also have a side wall stop, against which the good(s) and/or the ordered good(s) of the second order line can be applied. In particular, the front wall, the rear wall and the bottom may be formed as a single piece, for example by a length of fabric or woven cloth, which is mounted at an overhead conveyor/suspension rod at its upper end and forms a loop in the bottom area. In a closed position, the front wall and the rear wall have only a small distance from each other, whereby the loading opening and unloading opening has a small surface area and the storing space of the hanging bag has a small volume. In the case of a length of fabric or woven cloth, its upper ends equally have only a small distance from each other, and the loop formed by the length of fabric or woven cloth is narrow. In the closed position, the good(s) and/or the ordered good(s) of the second order line can thus be stored and transported in a narrow space. In an open position, in contrast, the front wall and the rear wall have a large distance from each other, whereby the loading opening and unloading opening has a large surface area and the storing space of the hanging bag has a large volume. In the case of a length of fabric or woven cloth, its upper ends equally have a large distance from each other, and the loop formed by the length of fabric or woven cloth is wide. In the open position, the hanging bag is thus easy to load and unload. Such a hanging bag is disclosed, for example, in the German utility models DE 20 2017 106 993 U1, DE 20 2017 100 206 U1 or the Austrian patent application A 50320/2018.

It should also be noted in this context that not all hanging bags must have the same properties, but hanging bags may also be configured differently. In addition, hanging bags may have multiple storing zones/storing compartments. It should be noted in addition that it is not necessarily the case that only hanging bags are conveyed and/or stored on the second conveying system and only hanging bags are conveyed and/or stored in the second storage zone. For example, also "suspended carriers" for hanging articles (e.g. coat hangers) may be conveyed and stored there. These suspended carriers do not necessarily comprise a hanging bag, yet they may be arranged on the exterior or on the interior of the hanging bag. Such combined, second loading aids, which comprise both a hanging bag and means for suspending a coat hanger, or even the coat hanger itself, can be used particularly universally. Therefore, different second loading aids can be stored and transported in the second storage zone and on the second conveying system, in particular both hanging bags and suspended carriers for hanging articles (e.g. coat hangers).

The "operating position" of a first or second loading aid is characterized in that goods are storable and transportable in it using the conveying system.

The "first conveying system" is used to transport the first loading aids. The "second conveying system" is used to transport the second loading aids (hanging bags). The "third conveying system" is used to transport the target loading aids.

The "first conveying system" and/or "second conveying system" and/or "third conveying system" may comprise (a) "fixed-installation conveying device(s)" and/or "autonomous conveying vehicles".

For the transport of goods, "(a) fixed-installation conveyor(s)" require(s) permanently-arranged devices. For example, a lift requires a frame at which a lifting platform is moved. In contrast to this, the lifting platform alone is non-functional. (A) fixed-installation conveying device(s) is/are in particular characterized in that it/they cannot be extracted from the storage and order-picking system without loosening fastenings. A fixed-installation conveying system is/are to be understood to mean, in particular, roller conveyors, belt conveyors, chain conveyors and suchlike. In contrast to this, an autonomous industrial truck can be extracted from the storage and order-picking system without loosening fastenings.

Within the scope of the invention, "automated conveying vehicles" are to be understood to mean self-propelled and/or driverless conveying vehicles for the transport of goods, which travel along permanently specified lanes or which are freely guided, i.e. without fixed track guidance. A fixed track guidance can be specified at the bottom of the travel surface, for example using optical color stripes, with magnetic strips, with marker tags or also with rails. An automated conveying vehicle has in particular a transport platform, on which the goods/ordered goods to be transported are received temporarily. Instead of the transport platform, or additionally to it, the automated conveying vehicle may also have a (telescopable) suspension rod and/or overhead conveyor for receiving hanging bags and, if applicable, suspended carriers. For example, the transport platform/suspension rod may be permanently affixed to the conveying vehicle, yet the transport platform/suspension rod may also be vertically and/or laterally movable relative to an underframe of the conveying vehicle, for example in order to be able to store goods/ordered goods into a storage rack and retrieve them from the storage rack. Wheels, of which at least one is driven, are arranged at the underframe. Further, an automated conveying vehicle also comprises an electronic control for receiving commands by a superordinate control and for controlling/regulating the movements of the automated conveying vehicle.

A "storage and retrieval unit" is an automated conveying vehicle which travels on rails and may be configured as a single-level-storage and retrieval unit (also referred to as "shuttle") or as a multilevel-storage and retrieval unit. For their operation, storage and retrieval units require elements of fixed-installation conveying system (namely the rails). For this reason, storage and retrieval units are, within the scope of the invention, counted among the fixed-installation conveying system.

An "autonomous industrial truck" is a non-rail guided automated conveying vehicle. At least one of the wheels is steerable, unless the autonomous conveying vehicle has wheels with which also a lateral movement can be executed (e.g. Mecanum wheels). An autonomous industrial truck also comprises sensors for capturing the environment of the industrial truck and for spatial orientation.

A "picking station" is a station and/or a zone or location at or in which ordered goods can be loaded into or onto a target loading aid. The picking station may have a picking control for controlling the picking process of the ordered goods. Yet it would also be conceivable that the picking process is controlled, alternatively or additionally, by the order-processing computer.

A "reloading station" is a station and/or a zone or location at or in which transfer goods can be reloaded from a first loading aid into a hanging bag. The reloading station may have a reloading control for controlling the reloading process of the transfer goods. Yet it would also be conceivable that the reloading process is controlled, alternatively or additionally, by the warehouse computer.

An "unloading station" is a station and/or a zone or location at or in which delivered goods can be loaded into or onto a first loading aid. These goods may be delivered in bulk or be stored in or on delivery loading aids. The unloading station may have an unloading control for controlling the unloading process of the goods.

An unloading station, a reloading station and a picking station may respectively be configured for automatic, manual or mixed automatic/manual operation, wherein the manual operation may in particular be computer-aided. To that end, said stations may comprise various functional units, for example a robot, a tilting device for tilting a first loading aid at a provisioning position (e.g. for reasons of ergonomics), an unloading device for unloading a hanging bag and/or a device for opening and/or closing a hanging bag at a provisioning position. Further, a functional unit may be an output unit (e.g. a display or a voice output unit), an input unit (e.g. a keyboard, a touch display or a voice input unit) and/or a capturing unit (e.g. a scanner). Any combination of said functional units is possible, of course.

In automatic or mixed automatic/manual operation, the robot and/or the tilting device can be instructed to execute a specific sequence of movements. In manual or mixed automatic/manual operation, a worker can be instructed using the output unit to execute a specific process. The worker can offer feedback via the input unit and/or the capturing unit. The above-mentioned process is therefore done in a computer-aided manual manner. Said functional units may be controlled by a control of the respective station, i.e. by the unloading control of the unloading station, the reloading control of the reloading station or the picking control of the picking station. Yet it would also be conceivable that said functional units are controlled, alternatively or additionally, by the warehouse computer and/or order-processing computer.

In "automatic" operation, e.g. a robot independently executes specified sequences of movement. In "automated operation," a device can work, fully or partially, without human assistance. "Automated" operation may accordingly be automatic and/or computer-aided manual operation. In "computer-aided manual" operation, a worker receives instructions from a control and, if applicable, offers feedback to the control. In "mixed manual/automatic" operation, parts of a process are executed automatically (e.g. by a robot), other parts by a worker (e.g. in a computer-aided manual manner).

A "provisioning position" is generally a position at which a first loading aid, a hanging bag or a target loading aid is supplied and/or provisioned. At this position, a loading and/or unloading of the respective loading aid is possible. For example, the provisioning position may be formed by a stopping position for a first loading aid or a delivery goods carrier on a first conveying system, by a stopping position for a hanging bag on a second conveying system or by a stopping position for a target loading aid on a third conveying system.

An "order-picking provisioning position" is therefore a provisioning position which is arranged at a picking station and/or forms part of same. A "reloading provisioning position" is therefore a provisioning position which is arranged at a reloading station and/or forms part of same. An "unloading provisioning position" is therefore a provisioning position which is arranged at an unloading station and/or forms part of same.

A "mobile shelf unit" is a movable shelf unit which is not fixed at a specific location. A mobile shelf unit may in particular comprise wheels for easier transport.

An "overhead conveyor" is a conveyor at which hanging bags can be stored and/or transported suspended. An "overhead storage conveyor" is therefore an overhead conveyor at which hanging bags can be stored suspended and which is in particular arranged in the second storage zone. An "overhead transport conveyor" is an overhead conveyor via which hanging bags can be transported suspended. A "mobile overhead storage conveyor" is a movable overhead conveyor which is not fixed at a specific location. A mobile overhead storage conveyor may in particular be structured similarly to a mobile shelf unit and equally have wheels for easier transport. If the supporting surface, at which the hanging bag is in contact with the overhead conveyor, is configured hook-shaped or bracket-shaped, the hook or bracket of the hanging bag glides along the overhead conveyor during transport. If the supporting surface, at which the hanging bag is in contact with the overhead conveyor, is configured roller-shaped, the roller of the hanging bag rolls along the overhead conveyor during transport. The same is true for suspended carriers.

A "sorting device" is a device with which goods, in particular ordered goods, can be brought into a specified or specifiable sequence.

Further advantageous designs and further advancements of the invention result from the subclaims as well as from the description in combination with the figures.

It is advantageous if a setting to a partial or full unloading for a majority of types of good of the line of goods is maintained either for a specified period of time or for a specified number of transfer requests occurring consecutively and relating to the majority of types of good. Accordingly, a decision, once made, will be maintained for longer, whereby the probability for a full unloading of the first loading aid is increased. The longer said decision is maintained, the higher also said probability for the full unloading. The period of time may be, for example, 10 minutes, the number e.g. 10 transfer requests occurring consecutively and relating to these types of good. For example, said setting may be done by the warehouse computer or the reloading station.

Yet it is also advantageous if a setting to a partial or full unloading for a type of good is maintained either for a specified period of time or for a specified number of transfer requests occurring consecutively and relating to these types of good. Also in this case, a decision, once made, will be maintained for longer, whereby the probability for a full unloading of the first loading aid is equally increased. However, the decision refers to a specific type of good, and not to a majority of types of good of the line of goods. The longer said decision is maintained, the higher, once again, said probability for the full unloading. In this variant, too, the period of time may be, for example, 10 minutes, the number e.g. 10 transfer requests occurring consecutively and relating to these types of good. For example, said setting may be done, once again, by the warehouse computer or the reloading station.

It is furthermore advantageous if a setting to a partial or full unloading applies to all first loading aids which are required for the execution of a transfer request. If a transfer request relates to multiple first loading aids, all but one are fully unloaded. With regard to the remaining last first loading aid, the above setting applies. This means that the remaining last first loading aid is fully or partially unloaded during the execution of the transfer request, depending on whether a parameter which is allocated to a type of good reaches (and/or falls below or rises above) a threshold value. Alternatively, the above rule may also be defined as follows: order-picking method, in which a setting to a full unloading applies to all first loading aids which are required for the execution of a transfer request and a setting to a partial unloading applies to one of the first loading aids which are required for the execution of a transfer request. In any case, the full unloading of the first loading aid and a return storing back into the first storage zone of a remaining quantity of goods remaining in or on a first loading aid associated with it, if applicable, is done, again, in a deterministic manner, and not in a random manner. For example, said setting may be done, once again, by the warehouse computer or the reloading station.

In addition, it is of advantage if the parameter allocated to a type of good forms part of the group: rate of turnover of the type of good, rate of turnover of the type of good in the second storage zone, number of transfer goods of the type of good to be reloaded. The "rate of turnover of a type of good" specifies how many goods of the respective type of good are requested by an ordering entity and subsequently dispatched in a specific space of time. Often, the goods are categorized into "fast-moving consumer goods" and "slow-moving consumer goods." Fast-moving consumer goods are therefore goods with a high rate of turnover, slow-moving consumer goods are goods with a low rate of turnover. The "number of reloadable transfer goods" specifies how many goods of a specific type of good are transferred from the first storage zone into the second storage zone during a transfer execution.

It is particularly advantageous if
the parameter allocated to a type of good is a rate of turnover of a type of good (occurring in the second storage zone),
the threshold value is a rate-of-turnover threshold value, which subdivides the line of goods into a share of types of good with a high rate of turnover and a share of types of good with a low rate of turnover, and
the first loading aid is fully unloaded (at all times) during execution of a transfer request if the respective type of good belongs to the share of the line of goods available with a high rate of turnover which is above a rate-of-turnover threshold value.

On the one hand, this advantageously results in the number of the reloading operations at the reloading station being kept relatively low for transfer goods with a high rate of turnover (fast-moving consumer goods), as either the requested number of transfer goods is reloaded from the first loading aid into the hanging bag, or a higher number. On the other hand, the second storage zone is not overly strained by ordered goods with a low rate of turnover, which are only rarely requested by a customer (slow-moving consumer goods).

In the above context, it is particularly advantageous if the first loading aid, during execution of a transfer request,
i) is only fully unloaded if a target number of transfer goods to be reloaded is larger than the number, or equal to the number, of the goods located in the first loading aid, and
ii) is partially unloaded if a target number of transfer goods to be reloaded is smaller than the number of the goods located in the first loading aid,
if the respective type of good, in the cases i) and ii), belongs to the share of the line of goods available with a low rate of turnover which is below the rate-of-turnover threshold value.

Accordingly, the first loading aid is not always fully unloaded during execution of a transfer request if the respective type of good, in the cases i) and ii), belongs to the share of the line of goods available with a low rate of turnover (slow-moving consumer goods) which is below the rate-of-turnover threshold value. Yet the first loading aid may be fully unloaded, also in this case, if a target number of transfer goods to be reloaded is (coincidentally) larger than the number of the goods located in the first loading aid, or equal to the number of goods located the in the first loading aid.

It is furthermore advantageous if the number and/or target number of the transfer goods to be rearranged is determined by means of one parameter, or multiple parameters, from the group: rate of turnover of this type of good, number of the goods of this type of good in the second storage zone. In particular, the number and/or target number of the transfer goods to be rearranged is higher in goods with a high rate of turnover (fast-moving consumer goods) than in goods with a low rate of turnover (slow-moving consumer goods). Accordingly, few reloading operations, measured against the number of transfer goods, take place at the reloading station for goods with a high rate of turnover, whereas many reloading operations, measured against the number of transfer goods, take place at the reloading station for goods with a low rate of turnover. Alternatively or additionally, the number and/or target number of the transfer goods to be rearranged can be determined by means of the number of the goods of this type of good in the second storage zone. In particular, the number and/or target number of the transfer goods to be rearranged is high when the warehouse stock of the respective type of good (i.e. the number of the goods of the respective type of good) is low in the second storage zone. In contrast to this, the number and/or target number of the transfer goods to be rearranged is low when the stock level of the respective type of good is high in the second storage zone. In particular, the number and/or target number of the transfer goods to be rearranged is determined by the warehouse computer.

According to another variant of the order-picking method, it is of particular advantage if
- the parameter allocated to a type of good is a target number of transfer goods of a type of good which is to be transferred from the first storage zone into the second storage zone,
- the threshold value is a rearrangement threshold value, from which a first loading aid loaded with goods of said type of good is fully unloaded,
- a target number of transfer goods of the respective type of good to be reloaded is determined for the transfer request,
- the actual number of the actually reloaded transfer goods corresponds to the target number if the target number is smaller, or equal, to the rearrangement threshold value, and the actual number of the actually reloaded transfer goods corresponds to the total number of the goods located in the first loading aid if the target number is above said rearrangement threshold value and
- (in the storage and order-picking system) at least one rearrangement threshold value $SW_{Umlager}$ referring or convertible to the number of goods exists, for which the following is true:

$$SW_{Umlager} < n_{Waren} - 1$$

wherein $n_{Waren}$ specifies the number of goods respectively being stored in or on these first loading aids.

In this embodiment of the order-picking method proposed, a first loading aid is fully unloaded whenever the target number is (coincidentally) close to the number of the goods being stored in the first loading aid. Accordingly, a minor and non-requested excess quantity of transfer goods is accepted into the second storage zone instead of return-storing these into the first storage zone. This prevents the first conveying system from being excessively strained by the return storing of first loading aids into the first storage zone.

Here, the above-mentioned rule can be followed by the requesting or the executing system, i.e. by adequate specification by the warehouse computer or by checking the specification at the reloading station. If the rule is implemented by the reloading station, the warehouse computer need not have any information on the number of the goods being stored in the first loading aid. If, in contrast, the warehouse computer has information on the number of the goods being stored in the first loading aid, the above-mentioned rule can, in principle, also be carried out by the warehouse computer itself, whereby a strain, in terms of control technology, on the reloading station is reduced.

Generally, the rearrangement threshold value can be specified directly as a number of goods, yet the rearrangement threshold value could also be specified as a percentage. For the execution of the above-mentioned rule, the percentage rearrangement threshold value is multiplied by the respective number of the goods being stored in the first loading aid in order to obtain an absolute value for the rearrangement threshold value. Accordingly, a percentage rearrangement threshold value is an example of a rearrangement threshold value convertible to the number of goods.

It is advantageous in the above context if the target number is determined by means of one parameter, or multiple parameters, from the group: rate of turnover of this type of good, number of the goods of this type of good in the second storage zone. In particular, the number and/or target number of the transfer goods to be rearranged is higher in goods with a high rate of turnover (fast-moving consumer goods) than in goods with a low rate of turnover (slow-moving consumer goods). Accordingly, few reloading operations, measured against the number of transfer goods, take place at the reloading station for goods with a high rate of turnover, whereas many reloading operations, measured against the number of transfer goods, take place at the reloading station for goods with a low rate of turnover. Alternatively or additionally, the number and/or target number of the transfer goods to be rearranged can be determined by means of the number of the goods of this type of good in the second storage zone. In particular, the number and/or target number of the transfer goods to be rearranged is high when the warehouse stock of the respective type of good (i.e. the number of the goods of the respective type of good) is low in the second storage zone. In contrast to this, the number and/or target number of the transfer goods to be rearranged is low when the stock level of the respective type of good is high in the second storage zone. In particular, the number and/or target number of the transfer goods to be rearranged is determined by the warehouse computer.

It is advantageous if the rearrangement threshold value is determined by means of one parameter, or multiple parameters, from the group: rate of turnover of the type of good, total capacity in the second storage zone, remaining capacity in the second storage zone, provisioning time during the retrieving of (a) transfer good(s) from the first storage zone. In this way, the processes during the transfer of the transfer good(s) from the first into the second storage zone can be optimized.

In particular,
- the rearrangement threshold value for a type of good with a first rate of turnover is lower than for a type of good with a smaller, second rate of turnover and/or the rearrangement threshold value for a second storage zone with a first total capacity is lower than for a second storage zone with a smaller, second total capacity and/or the rearrangement threshold value for a first remaining capacity in the second storage zone is lower than for a smaller, second remaining capacity in the second storage zone and/or the rearrangement threshold value for a first provisioning time during the retrieving of (a) transfer good(s) from the first storage zone is lower than for a shorter, second provisioning time during the retrieving of (a) transfer good(s) from the first storage zone.

Here, it is also of advantage if the rearrangement threshold value is reduced if the rate of turnover of the type of good increases and/or the rearrangement threshold value is reduced if the remaining capacity in the second storage zone increases and/or the rearrangement threshold value is reduced if the provisioning time during the retrieving of (a) transfer good(s) from the first storage zone increases, and vice versa.

In another favorable variant of the order-picking method, a transfer request for rearranging multiple transfer goods of a type of good from a first loading aid into at least one hanging bag is created when the number of the goods of this type of good in the second storage zone falls below a stock threshold value. This procedure ensures that a specific minimum number of goods of a specific type of good is in stock in the second storage zone at all times. Advantageously, the stock threshold value is set so as to enable a picking process of an average scope to be executed without a transfer request for goods of this type of good being required for this if the stock of goods of this type of good is above the stock threshold value at the beginning of the picking process. In other words, the picking process can be executed without goods of this type of good having to be reloaded into the second storage zone.

In another variant of the order-picking method, the content of the first loading aid during execution of a transfer request is separated into multiple hanging bags. This ensures that the order-picking method can also be executed when the holding capacity (holding volume) of the hanging bags is small compared to the holding capacity (holding volume) of the first loading aids. The entire unloading process for a first loading aid may also relate to multiple transfer requests issued at separate times.

It is also favorable if one piece of transfer goods is respectively reloaded into one hanging bag each during the execution of a transfer request. In this way, a subsequent picking process can be simplified. On the one hand, this simplifies the picking process as such, i.e. the removal from the hanging bag, which has, in particular, a positive effect on the automated order picking using a robot. If many goods are stored in a hanging bag, the selection and removal of a specific article by a robot is particularly challenging in terms of technology, after all. Furthermore, also a return storing back into the second storage zone of a remaining quantity of goods in the hanging bag will be obsolete.

Yet it is also favorable if, during the execution of a transfer request, multiple transfer goods are reloaded into one hanging bag each. In this way, the number of the hanging bags required for a subsequent picking process can be kept low. This ensures that a relative capacity utilization on the second conveying system by this picking process is kept low, i.e. the hanging bags required for a picking process have only a relatively small share in a total capacity utilization on the second conveying system. It should be pointed out in this context that, in this variant embodiment, not all goods being stored in a hanging bag must form ordered goods when said hanging bag is transported to the picking station. Instead, it would also be conceivable that an ordered good, or multiple ordered goods, is/are reloaded from the hanging bag into or onto the target loading aid and a remaining quantity of goods, which has no reference to said picking order and remains in the hanging bag, is return-stored into the second storage zone.

It is further favorable if the target loading aid is used as a dispatch loading aid and the at least one ordered good is loaded directly from the hanging bag into or onto the dispatch loading aid or is used as an interim loading aid and the at least one ordered good is loaded from the hanging bag into or onto the interim loading aid and then into or onto a dispatch loading aid.

The use of an interim loading aid can facilitate the picking process, in particular when many dispatch loading aids of different kinds are loaded with ordered goods. The use of a (uniform) interim loading aid ensures that the picking process at the picking station, i.e. the loading of the interim loading aid with ordered goods, can be harmonized and simplified.

It is further favorable if the first loading aid is selected from the group consisting of a container, a tray or a cardboard box, wherein the loading aid comprises a bottom with a receiving location on its upper side, on which a plurality of goods, or transfer goods, can be placed, and a transport surface on its lower side, by which the first loading aid is transportable on a first conveying system, as well as side walls rising up from the bottom. This enables the first loading aid to receive, in particular, multiple goods, or transfer goods.

Yet it is also advantageous if the first loading aid is configured as a mobile shelf unit, which comprises shelves with respectively at least one receiving location in storage planes located on top of one another, on which receiving location at least one good, or transfer good, can be placed. In particular, the first loading aid configured as a mobile shelf unit may comprise shelves with respectively at least one receiving location in storage planes located on top of one another, on which receiving location at least one transfer good, preferably a plurality of transfer goods, can be placed. In this way, a plurality of transfer goods can be transported at once. The number of journeys needed for a transfer request can thus be kept low.

It is further favorable if the storage and order-picking system has a sorting device cooperating with the second conveying system, which sorting device is configured for bringing ordered goods into a specifiable sequence. In this way, the picking process can be simplified. In particular, a sorting operation can take place in a single-stage or also multi-stage manner. The sorting device may be configured as a matrix sorter, for example. In addition to a sorting device, or instead of a sorting device, a sorting operation may also take place by an adequate removal of the ordered goods from the second storage zone, for example using an automated conveying vehicle (for example using a storage and retrieval unit or using an autonomous industrial truck).

It is advantageous in addition if the first conveying system and/or second conveying system comprises (a) fixed-installation conveying device(s) and/or autonomous industrial trucks. This enables the transport of the goods and/or transfer goods and/or ordered goods to be done in a flexible manner.

It is favorable if
the first storage zone comprises storage racks,
storage locations are provided in the storage racks, and
the first conveying system comprises an automated conveying vehicle, which enables the retrieving of the first loading aid with the transfer goods.

In this way, a plurality of goods and/or transfer goods can be stored in the first storage zone in a space-saving manner.

It is further favorable if the first conveying system comprises
a first conveying section for storing the first loading aid with (a) good(s) into the first storage zone, and
a second conveying section for retrieving a first loading aid with (a) transfer good(s) from the first storage zone,
wherein the automated conveying vehicle also enables the storing of the first loading aid with the good(s) into a storage location.

This enables goods to be stored into the first storage zone and transfer goods to be retrieved from the first storage zone. To that end, also a joint conveying section, instead of separate conveying sections, may be provided, which joint conveying section is operated bidirectionally.

Furthermore, it is favorable if the automated conveying vehicle
is displaceable in front of the storage locations along a rack aisle and
is equipped with a load handling device for transporting a first loading aid with (a) good(s) into a storage location and/or for transporting the first loading aid with the transfer goods from a storage location and
is configured as a rail guided storage and retrieval unit or as an autonomous industrial truck.

The measures proposed ensure that the goods can be stored in an automated manner and/or the transfer goods can be retrieved in an automated manner.

It is advantageous if
the shelf units are configured as mobile shelf units used as first loading aids, and
the automated conveying vehicle is configured as an autonomous industrial truck, and the mobile shelf units are transportable by the autonomous industrial truck.

In this way, a plurality of transfer goods can be transported at once. The number of journeys needed for a picking order can thus be kept low.

It is favorable in addition if the second storage zone comprises overhead storage conveyors, and
I) the second conveying system comprises overhead transport conveyors connected, in terms of conveyance, to the overhead storage conveyors and enable the storing of the hanging bag with the transfer good(s) into the second storage zone and/or the retrieving of the hanging bag with the ordered good(s) from the second storage zone and/or
II) the second conveying system comprises an automated conveying vehicle, which enables the storing of the hanging bag with the transfer good(s) into the second storage zone and/or the retrieving of the hanging bag with the ordered good(s) from the second storage zone.

The measures proposed ensure that the transfer goods can be stored in an automated manner and/or the ordered goods can be retrieved in an automated manner. In the case I), (a) fixed-installation conveying device(s) is/are provided to that end, in the case II), (a) non-fixed-installation conveying device(s) is/are provided to that end.

It is favorable if, in the case II), the automated conveying vehicle
is displaceable in front of the storage locations along a rack aisle and
is equipped with a handling device for transporting the hanging bag with the transfer good(s) into the overhead storage conveyor and/or for transporting the hanging bag with the ordered good(s) from the overhead storage conveyor and
is configured as a rail guided storage and retrieval unit or as an autonomous industrial truck.

The measures proposed ensure that the transfer goods can be stored into the second storage zone in an automated manner and/or the ordered goods can be retrieved from the second storage zone in an automated manner.

It is furthermore advantageous if
the overhead storage conveyors are configured so as to be mobile, and
the automated conveying vehicle, in the case II), is configured as an autonomous industrial truck, and the mobile overhead storage conveyors are transportable by the autonomous industrial truck.

In this way, a plurality of transfer goods, or ordered goods, can be transported at once. The number of journeys needed for a rearranging process, or a picking order, can thus be kept low.

A mobile and/or transportable overhead storage conveyor is, in particular, formed by a suspension rod, which can be manipulated by the autonomous industrial truck.

It is particularly advantageous if the autonomous industrial truck is configured both for transporting the mobile shelf units and for transporting the mobile overhead storage conveyors. The first and second conveying systems are, in this case, (at least partially) configured identical, and the autonomous industrial trucks can thus be used in a particularly flexible manner. A joining point between the first conveying system or second conveying system and the autonomous industrial trucks may in particular be formed by a location of the first conveying system or second conveying system (e.g. roller conveyor for first loading aids or overhead conveyor for hanging bags), from which location first loading aids or hanging bags are loaded onto autonomous industrial trucks of the above-mentioned kind, which can transport both first loading aids as well as hanging bags.

It should be noted in this context that the variants and advantages disclosed in relation to the storage and order-picking system presented equally relate to the order-picking method presented, and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
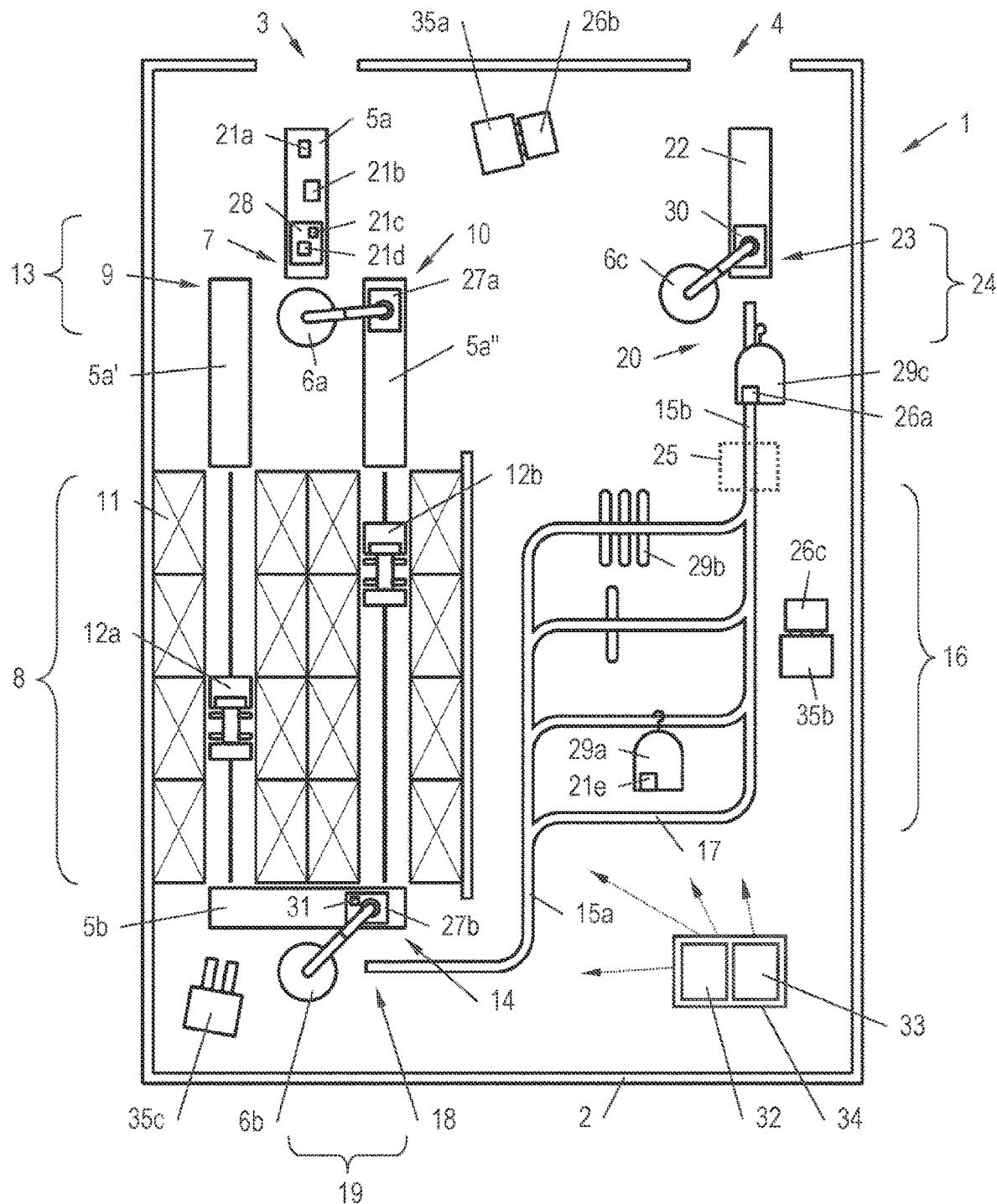
FIG. 1 an embodiment of a schematically-depicted storage and order-picking system with a first and second storage zone.

FIG. 1 shows an exemplary storage and order-picking system 1 in a schematized plan view. The storage and order-picking system 1 comprises a building 2, as well as a gate at the first goods acceptance zone 3 and a gate at the second goods transfer zone 4.

There are three first sections 5a, 5a' and 5a" of a first conveying system in the area of the goods acceptance zone 3. The first section 5a of the first conveying system connects the goods acceptance zone 3 with a first robot 6a. To that end, a first unloading provisioning position 7 is arranged at the end of the first section 5a of the first conveying system, in this example.

The other first sections 5a', 5a" of the first conveying system connect the first robot 6a with the first storage zone 8. To that end, a second unloading provisioning position 9 is arranged at the start of the first section 5a' of the first conveying system, and a third unloading provisioning position 10 is arranged at the start of the first section 5a" of the first conveying system, in this example. The first storage zone 8 comprises multiple storage racks 11, as well as storage and retrieval units 12a and 12b, which travel in rack aisles running between the storage racks 11. The first robot 6a, the first unloading provisioning position 7, the second unloading provisioning position 9 and the third unloading provisioning position 10 form, in particular, an unloading station 13 operated in an automated manner. Also conceivable is an unloading station (not shown) which, while comprising the first unloading provisioning position 7, the second unloading provisioning position 9 and the third unloading provisioning position 10, comprises no first robot 6a. The first robot 6a is then replaced by a person. The unloading can therefore be carried out automatically and/or manually (in particular in a computer-aided manner).

At the end of the rack aisles which is located opposite the first sections 5a', 5a" of the first conveying system, a second section 5b of the first conveying system is arranged, which leads to a second robot 6b. To that end, a first reloading provisioning position 14 is arranged at the end of the second section 5b of the first conveying system, in this example.

In the range of action of the second robot 6b, also a first section 15a of a second conveying system is arranged, which connects the second robot 6b, in terms of conveyance, with a second storage zone 16 with multiple overhead storage conveyors 17. To that end, a second reloading provisioning position 18 is arranged at the start of the first section 15a of the second conveying system, is in this example. The second robot 6b, the first reloading provisioning position 14 and the second reloading provisioning position 18 form, in particular, a reloading station 19 operated in an automated manner. Also conceivable is a reloading station (not shown) which comprises the first reloading provisioning position 14 and the second reloading provisioning position 18, but no second robot 6b. The second robot 6b is then replaced by a person. The reloading can therefore be carried out automatically and/or manually (in particular in a computer-aided manner).

Further, the second conveying system comprises a second section 15b, which connects the second storage zone 16 with a third robot 6c. To that end, a first order-picking provisioning position 20 is arranged at the end of the second section 15b of the second conveying system, in this example. The first section 15a of the second conveying system and the second section 15b of the second conveying system are configured as overhead transport conveyors. Also the overhead storage conveyor 17 is not necessarily configured only for storing goods 21a . . . 21d but may also be configured for transporting same.

Finally, the storage and order-picking system 1 comprises a third conveying system 22, which connects the third robot 6c with the goods transfer zone 4. To that end, a second order-picking provisioning position 23 is arranged at the start of the third conveying system 22, in this example. The third robot 6c, the first order-picking provisioning position 20 and the second order-picking provisioning position 23 form, in particular, a picking station 24 operated in an automated manner. Also conceivable is a picking station (not shown) which comprises the first order-picking provisioning position 20 and the second order-picking provisioning position 23, but no third robot 6c. The third robot 6c is then replaced by a person. The order picking can therefore be carried out automatically and/or manually (in particular in a computer-aided manner).

An optional sorting device 25 may also be arranged along the route of the second conveying system 15a, 15b in order to bring ordered goods 26a into a specifiable sequence.

The functioning of the storage and order-picking system 1 depicted in FIG. 1 is as follows:

Goods 21a . . . 21d are delivered at the goods acceptance zone 3 and loaded onto the first section 5a of the first conveying system. The goods 21a . . . 21d are transported to the unloading station 13 on the first section 5a of the first conveying system and supplied there, specifically at the first unloading provisioning position 7. Described below is the embodiment according to which the unloading station 13 comprises the first robot 6a. The goods 21a . . . 21d are reloaded, by the first robot 6a, from the first section 5a of the first conveying system onto the first section 5a' or 5a" of the first conveying system, specifically into or onto a first loading aid 27a, which is provisioned at the third unloading provisioning position 10. Using the storage and retrieval units 12a and 12b, the first loading aid 27a is stored into one of the storage racks 11. The first loading aids 27a, 27b respectively receive a plurality of goods 21a . . . 21d and are respectively configured so as to be different from a hanging bag. For example, the first loading aids 27a, 27b are configured as a container, tray or cardboard box. In the first storage zone 8, generally, goods 21a . . . 21d of different types of good are stored. The totality of the types of good stored corresponds to a line of goods available.

As is apparent in FIG. 1, the goods 21a . . . 21d can be delivered separated or in/on delivery goods carriers 28 (delivery bundles, for example pallets, cardboard box with goods). The goods 21a . . . 21d can be separated in the course of the storing process, yet this is not mandatory. Also the reloading into or onto a first loading aid 27a is not mandatory, but it would also be conceivable to store the delivery goods carrier 28 directly in the first storage zone 8. The delivery goods carrier 28 then takes the place of a first loading aid 27a, 27b.

In the second storage zone 16, the goods 21e are stored in second loading aids 29a, 29b, which are, in this example, respectively configured as a hanging bag. When a picking order for picking ordered goods is obtained, the ordered goods 26a required for this picking order are ascertained. Subsequently, said ordered goods 26a are retrieved from the second storage zone 16 and loaded into or onto a target loading aid 30 on the basis of the picking order. Specifically, a hanging bag 29c with the ordered good(s) 26a is conveyed to the picking station 24 to that end and provisioned at the first order-picking provisioning position 20. Described below is the embodiment according to which the picking station 24 comprises the third robot 6c. The ordered good(s) 26a contained in the hanging bag 29c is/are reloaded, by the third robot 6c, from the hanging bag 29c into the target loading aid 30, which is provisioned at the second order-picking provisioning position 23. Subsequently, the target loading aid 30 is conveyed via the third conveying system 22 to the goods transfer zone 4 and loaded, there, into a truck, for example.

In the example presented, the target loading aid 30 is used as a dispatch loading aid and to transport the ordered good(s) 26a out of the storage and order-picking system 1. It would also be conceivable that the target loading aid 30 is used as an interim loading aid and to interim-store (an) ordered good(s) 26a that has/have been picked and is/are intended for dispatching before being reloaded into or onto a dispatch loading aid. Generally, the target loading aid 30 may be configured as a container, cardboard box, tray, pallet, bag (in particular a "polybag"), pouch, sack, hanging bag or shelf unit.

Using the optional sorting device 25, the ordered goods 26a can be brought into in a specifiable sequence, unless such a sequence can be created already during the retrieving of the ordered goods 26a from the second storage zone 16.

If (a) good(s) 21a . . . 21e of a type of good in the second storage zone 16 is/are low in stock (e.g. when the number of the goods 21a . . . 21e of this type of good in the second storage zone 16 falls below a stock threshold value), a transfer or rearrangement request (rearrangement command) for reloading multiple transfer goods 31 of said type of good from a first loading aid 27a, 27b into at least one hanging bag 29a is generated, for example by a warehouse computer 32. On the basis of this transfer request, at least one first loading aid 27a, 27b with the required transfer goods 31 is subsequently retrieved from the first storage zone 8, specifically using one of the storage and retrieval units 12a, 12b. Afterwards, the loading aid 27a, 27b with the required transfer goods 31 is loaded onto the second section 5b of the first conveying system and transported by same to the reloading station 19 and specifically provisioned at the first reloading provisioning position 14 (see the transfer good(s) 31 at the first reloading provisioning position 14 in FIG. 1). Described below is the embodiment according to which the reloading station 19 comprises the second robot 6b. The transfer goods 31 required in the second storage zone 16 are removed, by the second robot 6b, from the first loading aid 27a, 27b and loaded into a hanging bag 29a provisioned at the second reloading provisioning position 18. Finally, the hanging bag 29a is transported via the first section 15a of the second conveying system into the second storage zone 16 and stored there into one of the overhead storage conveyors 17.

This procedure ensures that a specific minimum number of goods 21a . . . 21e of a specific type of good is in stock in the second storage zone 16 at all times. Advantageously, the stock threshold value is set so as to enable a picking process of an average scope to be executed without a transfer request for goods 21a . . . 21e of this type of good being required for this if the stock of goods 21a . . . 21e of this type of good is above the stock threshold value at the beginning of the picking process. In other words, the picking process can be executed without goods 21a . . . 21e of this type of good having to be reloaded into the second storage zone 16.

The transfer request is generated and executed without reference to, and independent of, a picking order. The process for picking ordered goods into or onto a target loading aid 30 thus runs parallel (and independent in terms of control technology) to the process for rearranging the transfer goods 31 from the first storage zone 8 into the second storage zone 16. Yet the two processes are influenced by the fact that a loading of ordered goods of a specific type of good results in a lower warehouse stock of goods 21a . . . 21e of this type of good in the second storage zone 16, whereby, as described above, a transfer request is caused. If, in contrast, there is a bottleneck of goods 21a . . . 21e of a specific type of good in the second storage zone 11 due to a longer absence of rearranging processes of the transfer goods 31 from the first storage zone 8 into the second storage zone 11, a picking order can, under certain circumstances, not be executed.

During the execution of the transfer request, the first loading aid 27a, 27b is advantageously fully or partially unloaded (and after the execution of the transfer request is in a fully or partially unloaded state), depending on whether a parameter which is allocated to a type of good reaches (and/or falls below or rises above) a threshold value.

Variant Embodiment I

For example, the parameter allocated to a type of good may be a rate of turnover of a type of good (occurring in the second storage zone 16), and the threshold value may be a rate-of-turnover threshold value, which subdivides the line of goods into a share of types of good with a high rate of turnover (fast-moving consumer goods) and a share of types of good with a low rate of turnover (slow-moving consumer goods). The first loading aid 27a, 27b is, in this variant, (at all times) fully unloaded during execution of a transfer request if the respective type of good belongs to the share of the line of goods available with a high rate of turnover (i.e. to the fast-moving consumer goods) which are above a rate-of-turnover threshold value.

If (a) transfer good(s) 31 and/or the type of good of the transfer good(s) 31 belong(s) to the share of the line of goods available with a low rate of turnover (i.e. to the slow-moving consumer goods) which are below the rate-of-turnover threshold value, the first loading aid 27a, 27b, during execution of a transfer request,
  i) is only fully unloaded if a target number of transfer goods 31 to be reloaded is larger than the number, or equal to the number, of the goods 21a . . . 21e located in the first loading aid 27a, 27b and
  ii) is partially unloaded if a target number of transfer goods 31 to be reloaded is smaller than the number of goods 21a . . . 21e located in the first loading aid 27a, 27b.

Therefore, the first loading aid 27a, 27b is not always fully unloaded during execution of a transfer request if the respective type of good, in the cases i) and ii), belongs to the share of the line of goods available with a low rate of turnover (slow-moving consumer goods) which are below the rate-of-turnover threshold value. The first loading aid 27a, 27b is only fully unloaded if a target number of transfer goods 31 to be reloaded is (coincidentally) larger than the number, or equal to the number, of the goods 21a . . . 21e/transfer goods 31 located in the first loading aid 27a, 27b.

On the one hand, the measures proposed advantageously result in the number of the reloading operations at the reloading station 19 being kept relatively low for transfer goods 31 with a high rate of turnover (fast-moving consumer goods), as either the requested number of transfer goods 31 is reloaded from the first loading aid 27a, 27b into the hanging bag 29a . . . 29c, or a higher number. On the other hand, the second storage zone 16 is not overly strained by ordered goods with a low rate of turnover, which are only rarely requested by a customer (slow-moving consumer goods).

The number and/or target number of the transfer goods 31 to be rearranged can be determined by means of one parameter, or multiple parameters, from the group: rate of turnover of this type of good, number of the goods 21a . . . 21e of this type of good in the second storage zone 16.

In particular, the number and/or target number of the transfer goods 31 to be rearranged is higher in goods 21a . . . 21e with a high rate of turnover (fast-moving consumer goods) than in goods 21a . . . 21e with a low rate of turnover (slow-moving consumer goods). Accordingly, few reloading operations, measured against the number of transfer goods 31, take place at the reloading station 19 for goods 21a . . . 21e with a high rate of turnover, whereas many reloading operations, measured against the number of transfer goods 31, take place at the reloading station 19 for goods 21a . . . 21e with a low rate of turnover. Alternatively or additionally, the number and/or target number of the transfer goods 31 to be rearranged can be determined by means of the number of the goods 21a . . . 21e of this type of good in the second storage zone 16. In particular, the number and/or target number of the transfer goods 31 to be rearranged is high when the warehouse stock of the respective type of good (i.e. the number of the goods 21a . . . 21e of the respective type of good) is low in the second storage zone 16. In contrast to this, the number and/or target number of the transfer goods 31 to be rearranged is low when the stock level of the respective type of good is high in the second storage zone 16. In particular, the number and/or target number of the transfer goods 31 to be rearranged can be determined by the warehouse computer 32.

Variant Embodiment II

The parameter allocated to a type of good may also be a target number of transfer goods 31 of a type of good, which is to be transferred from the first storage zone 8 into the second storage zone 16, and the threshold value may be a rearrangement threshold value, from which a first loading aid 27a, 27b loaded with goods 21a . . . 21e of said type of good is fully unloaded. For the transfer request, once again, a target number of transfer goods 31 of the respective type of good to be reloaded is determined, in particular by the warehouse computer 32. The actual number of the actually reloaded transfer goods 31 corresponds to the target number if the target number is smaller, or equal to, the rearrangement threshold value, and the actual number of the actually reloaded transfer goods 31 corresponds to the total number of the goods 21a . . . 21e located in the first loading aid 27a, 27b if the target number is above said rearrangement threshold value. In the storage and order-picking system 1, at least one rearrangement threshold value $SW_{Umlager}$ referring or convertible to the number of goods exists, for which the following is true:

$$SW_{Umlager} < n_{Waren} - 1$$

wherein $n_{Waren}$ specifies the number of goods 21a . . . 21e respectively being stored in or on these first loading aids 27a, 27b.

In this embodiment of the order-picking method proposed, a first loading aid 27a, 27b is therefore fully unloaded whenever the target number is (coincidentally) close to the number of the goods 21a . . . 21e being stored in the first loading aid 27a, 27b. Accordingly, a minor and non-requested excess quantity of transfer goods 31 are accepted into the second storage zone 16 instead of return-storing these into the first storage zone 8. This prevents the second section 5b of the first conveying system from being excessively strained by the return storing of first loading aids 27a, 27b into the first storage zone 8.

Here, the above-mentioned rule can be followed by the requesting or the executing system, i.e. by adequate specification by the warehouse computer 32 or by checking the specification at the reloading station 19. If the rule is implemented by the reloading station 19 (in particular by the second robot 6b), the warehouse computer 32 need not have any information on the number of the goods 21a . . . 21e being stored in the first loading aid 27a, 27b. If, in contrast, the warehouse computer 32 has information on the number of the goods 21a . . . 21e being stored in the first loading aid 27a, 27b, the above-mentioned rule can, in principle, also be carried out by the warehouse computer 32 itself, whereby a strain, in terms of control technology, on the reloading station 19 is reduced.

Generally, the rearrangement threshold value can be specified directly as a number of goods 21a . . . 21e, yet the rearrangement threshold value could also be specified as a percentage. For the execution of the above-mentioned rule, the percentage rearrangement threshold value is multiplied by the respective number of the goods 21a . . . 21e being stored in the first loading aid 27a, 27b in order to obtain an absolute value for the rearrangement threshold value. Accordingly, a percentage rearrangement threshold value is an example of a rearrangement threshold value convertible to the number of goods.

The number and/or target number of the transfer goods 31 to be rearranged can, once again, be determined by means of one parameter, or multiple parameters, from the group: rate of turnover of this type of good, number of the goods 21a . . . 21e of this type of good in the second storage zone 16.

In particular, the number and/or target number of the transfer goods 31 to be rearranged is higher in goods 21a . . . 21e with a high rate of turnover (fast-moving consumer goods) than in goods 21a . . . 21e with a low rate of turnover (slow-moving consumer goods). Accordingly, few reloading operations, measured against the number of transfer goods 31, take place at the reloading station 19 for goods 21a . . . 21e with a high rate of turnover, whereas many reloading operations, measured against the number of transfer goods 31, take place at the reloading station 19 for goods 21a . . . 21e with a low rate of turnover. Alternatively or additionally, the number and/or target number of the transfer goods 31 to be rearranged can be determined by means of the number of the goods 21a . . . 21e of this type of good in the second storage zone 16. In particular, the number and/or target number of the transfer goods 31 to be rearranged is high when the warehouse stock of the respective type of good (i.e. the number of the goods 21a ... 21e of the respective type of good) is low in the second storage zone 16. In contrast to this, the number and/or target number of the transfer goods 31 to be rearranged is low when the stock level of the respective type of good is high in the second storage zone 16. In particular, the number and/or target number of the transfer goods 31 to be rearranged can be determined by the warehouse computer 32.

It is advantageous if the rearrangement threshold value is determined by means of one parameter, or multiple parameters, from the group: rate of turnover of the type of good, total capacity in the second storage zone 16, remaining capacity in the second storage zone 16, provisioning time during the retrieving of (a) transfer good(s) 31 from the first storage zone 8. In this way, the processes during the transfer of the transfer good(s) 31 from the first storage zone 8 into the second storage zone 16 can be optimized.

In particular, the rearrangement threshold value for a type of good with a first rate of turnover is lower than for a type of good with a smaller, second rate of turnover and/or the rearrangement threshold value for a second storage zone 16 with a first total capacity is lower than for a second storage zone 16 with a smaller, second total capacity and/or the rearrangement threshold value for a first remaining capacity in the second storage zone 16 is lower than for a smaller, second remaining capacity in the second storage zone 16 and/or the rearrangement threshold value for a first provisioning time during the retrieving of (a) transfer good(s) 31 from the first storage zone 8 is lower than for a shorter, second provisioning time during the retrieving of (a) transfer good(s) 31 from the first storage zone 8.

Here, it is also of advantage if the rearrangement threshold value is reduced if the rate of turnover of the type of good increases and/or the rearrangement threshold value is reduced if the remaining capacity in the second storage zone 16 increases and/or the rearrangement threshold value is reduced if the provisioning time during the retrieving of (a) transfer good(s) 31 from the first storage zone 8 increases, and vice versa.

In both variant embodiments I and II, the fact that a first loading aid 27a, 27b is fully or partially unloaded during the execution of a transfer execution does not depend on whether the same number of goods 21a ... 21e are coincidentally stored in the first loading aid 27a, 27b as were requested by the transfer request, or more goods 21a ... 21e than were requested by the transfer request, but on whether or not said threshold value is reached. Accordingly, a possible return conveying back into the first storage zone 8 of a remaining quantity of goods 21a ... 21e remaining in the first loading aid 27a, 27b equally does not depend on whether the same number of goods 21a ... 21e are coincidentally stored in the first loading aid 27a, 27b as were requested by the transfer request, or more goods 21a ... 21e than were requested by the transfer request. Rather, the full unloading of the first loading aid 27a, 27b and a return storing back into the first storage zone 8 of a remaining quantity of goods 21a ... 21e remaining in the first loading aid 27a, 27b associated with it, if applicable, is done in a deterministic manner. The processes running between the first storage zone 8 and the second storage zone 16 are therefore easier to plan and foresee than this is the case in the prior art.

This finds its expression, for example, in the fact that a probability P for a full unloading of the first loading aid 27a, 27b (or a group of first loading aids 27a, 27b, e.g. a group which is involved in a transfer request) fits the constraint $$P > \frac{1}{n_{Waren}}$$

wherein $n_{Waren}$ specifies the number of the goods 21a ... 21e being stored in or on this (these) first loading aid(s) 27a, 27b. In more general terms, this means $$P > \frac{k}{n_{Waren}} \quad k \geq 1 \quad (\text{e.g. } k = 1.1)$$

The above constraints describe a full unloading of the first loading aid 27a, 27b that is targeted and not dependent on coincidence.

It would also be conceivable that a probability P for a full unloading of the first loading aids 27a, 27b which are used for storing the line of goods fits the constraint $$P > \frac{n_{LHM1}}{n_{Waren}}$$

wherein $n_{LHM1}$ specifies the number of first loading aids 27a, 27b used for storing the line of goods and $n_{Waren}$ the number of goods 21a ... 21e being stored in or on these first loading aids 27a, 27b. In more general terms, this means:

$$P > k \cdot \frac{n_{LHM1}}{n_{Waren}} \quad k \geq 1 \quad (\text{e.g. } k = 1.1)$$

Also these formulae describe a full unloading of the first loading aid 27a, 27b which is targeted and not dependent on coincidence, here, however, referring to the total line of goods.

In another variant, a probability P for a full unloading of the first loading aid 27a, 27b fits the constraint $$\frac{n_{LHM1vollst}}{n_{LHM1}} > k \cdot \frac{n_{LHM1}}{n_{Waren}} \quad k \geq 1 \quad (\text{e.g. } k = 1.1)$$

wherein $n_{LHMvollst}$ specifies the number of fully unloaded first loading aids 27a, 27b (in a period of time t), $n_{LHM1}$ the number of first loading aids 27a, 27b involved in a transfer request (in this period of time t) and $n_{Waren}$ the number of goods 21a ... 21e being stored in or on these first loading aids 27a, 27b involved in a transfer request (in this period of time t).

In this variant embodiment, reference is made to the reloading point (i.e. to the reloading station 19) and/or to the reloading operations actually performed. The period of time t should be selected to be sufficiently long, e.g. t=1 h or t=1 day.

It is generally of advantage if a setting to a partial or full unloading for a majority of types of good of the line of goods is maintained either for a specified period of time or for a specified number of transfer requests occurring consecutively and relating to the majority of types of good. Accordingly, a decision, once made, will be maintained for longer, whereby the probability for a full unloading of the first loading aid 27a, 27b is equally increased. The longer said decision is maintained, the higher also said probability for the full unloading. The period of time may be, for example, 10 minutes, the number e.g. 10 transfer requests occurring consecutively and relating to these types of good.

It is also of advantage if a setting to a partial or full unloading for a type of good is maintained either for a specified period of time or for a specified number of transfer requests occurring consecutively and relating to these types of good. Also in this case, a decision, once made, will be maintained for longer, whereby the probability for a full unloading of the first loading aid 27a, 27b is equally increased. However, the decision refers to a specific type of good, and not to a majority of types of good of the line of goods. The longer said decision is maintained, the higher, once again, said probability for the full unloading. In this variant, too, the period of time may be, for example, 10 minutes, the number e.g. 10 transfer requests occurring consecutively and relating to these types of good.

Furthermore, it is of advantage if a setting to a partial or full unloading applies to all first loading aids 27a, 27b which are required for the execution of a transfer request. If a transfer request relates to multiple first loading aids 27a, 27b, all but one are fully unloaded. With regard to the remaining, last first loading aid 27a, 27b, the above setting applies. This means that the remaining, last first loading aid 27a, 27b is fully or partially unloaded during the execution of the transfer request, depending on whether a parameter which is allocated to a type of good reaches (and/or falls below or rises above) a threshold value. The full unloading of the first loading aid 27a, 27b and a return storing back into the first storage zone 8 of the remaining quantity of goods 21a . . . 21e remaining in or on a first loading aid 27a, 27b associated with it, if applicable, is done, again, in a deterministic, and not in a random, manner.

It is generally conceivable that, during execution of a transfer request, the content of the first loading aid 27a, 27b is separated into multiple hanging bags 29a . . . 29c. This ensures that the order-picking method can also be executed when the holding capacity of the hanging bags 29a . . . 29c is small compared to the holding capacity of the first loading aids 27a, 27b. The total unloading process for a first loading aid 27a, 27b may also relate to multiple transfer requests issued at separate times.

It is generally conceivable that, during the execution of a transfer request, one piece of transfer goods 31 is respectively reloaded into one hanging bag 29a . . . 29c each. In this way, a subsequent picking process can be simplified, in particular if, as in the example depicted, this picking process is carried out using a robot 6c. If a large number of goods 21a . . . 21e are stored in a hanging bag 29a . . . 29c, the selection and removal of a specific article by a robot 6c is particularly challenging in terms of technology. In addition, also a return storing back into the second storage zone 16 of a remaining quantity of (a) good(s) 21a . . . 21e in the hanging bag 29a . . . 29c is obsolete.

Yet, alternatively, it is also conceivable that, during the execution of a transfer request, multiple transfer goods 31 are reloaded into one hanging bag 29a . . . 29c each. In this way, the number of the hanging bags 29a . . . 29c required for a picking process, and thus a capacity utilization on the second conveying system 15a, 15b, can be kept low.

For the controlling of the above-mentioned processes, the warehouse computer 32 for generating a transfer or rearrangement request for rearranging multiple transfer goods 31 of a type of good from the first storage zone 8 into the second storage zone 16 when the goods 21a . . . 21e of this type of good are low in stock in the second storage zone 16 is provided in FIG. 1, as well as the order-processing computer 33 for acquiring an order for picking at least one ordered good 26a and for ascertaining the ordered good(s) 26a required for this picking order. Here, the warehouse computer 32 can control the storage and retrieval units 12a, 12b, the second section 5b of the first conveying system and the reloading station 19 operated in an automated manner, in particular the second robot 6b, such as this is symbolized in FIG. 1 by the two dotted arrows on the left, which point away from the area of the warehouse computer 32. The order-processing computer 33 can control the overhead storage conveyor 17, the second section 15b of the second conveying system 15b and the picking station 24 operated in an automated manner, in particular the third robot 6c, such as this is symbolized in FIG. 1 by the two dotted arrows on the right, which point away from the area of the order-processing computer 33. The warehouse computer 32 and the order-processing computer 33 may also, as depicted in FIG. 1, be integrated in a warehouse and order-processing computer 34. In this case, the warehouse computer 32 and the order-processing computer 33 may be part of a software, which runs in the warehouse and order-processing computer 34.

It should be noted in this context that the hanging bag 29b in FIG. 1 is depicted in the actual position (namely suspended), whereas the hanging bags 29a and 29c are depicted rotated into the image plane in order to be able to better depict the content of the hanging bags 29a and 29c, i.e. the good(s) 21e and the ordered good(s) 26a. In addition, it should be noted that, although, in the examples shown, reference is made to hanging bags 29a . . . 29c, also suspended carriers with hanging articles can be stored and transported in the second storage zone 16 and on the second conveying system 15a, 15b.

In the example depicted, the second storage zone 16 comprises overhead storage conveyors 17 and the second conveying system 15a, 15b overhead transport conveyors, which are connected, in terms of conveyance, with the overhead storage conveyors 17 and enable the storing of the hanging bag 29a . . . 29c with the transfer good(s) 31 into the second storage zone 16 and/or the retrieving of the hanging bag 29a . . . 29c with the ordered good(s) 26a from the second storage zone 16.

Alternatively or additionally, it would also be conceivable that the second conveying system 15a, 15b comprises an automated conveying vehicle 12a, 12b, which enables the storing of the hanging bag 29a . . . 29c with the transfer good(s) 31 into the second storage zone 16 and/or the retrieving of the hanging bag 29a . . . 29c with the ordered good(s) 26a from the second storage zone 16. In particular, the automated conveying vehicle 12a, 12b may be configured as a rail guided storage and retrieval unit, such as this is also the case in the first storage zone 8. This storage and retrieval unit 12a, 12b may be displaceable in front of the storage locations along a rack aisle and be equipped with a handling device for transporting the hanging bag 29a . . . 29c with the transfer good(s) 31 into the overhead storage conveyor 17 and/or for retrieving the hanging bag 29a . . . 29c with the ordered good(s) 26a from the overhead storage conveyor 17.

Further, three autonomous industrial trucks 35a . . . 35c are depicted by way of example in FIG. 1 in the area of the storage and order-picking system 1.

Using the autonomous industrial truck 35a, (an) ordered good(s) 26b, for example, can be transported directly from the goods acceptance zone 3 to the goods transfer zone 4 (and not removed from the first storage zone 8 or the second storage zone 16). In the example shown, this/these ordered good(s) 26b therefore form(s) (a) so-called "cross-docking good(s)." In particular, such ordered goods 26b may be intended for the intermediate trade or end sellers ("retail") and ordered goods 26a from the second storage zone 16 may be intended for the end customer ("e-commerce").

It is also conceivable that ordered goods 26c are transported directly from the first storage zone 8 to the picking station 24 or to the goods transfer zone 4, i.e. by bypassing the second storage zone 16, such as it is depicted, for example, in FIG. 1 for the autonomous industrial truck 35b.

It is further conceivable that the storage and order-picking system 1 also comprises different picking stations 24 especially tailored to the needs of the intermediate trade/end seller and of the end customer, which are coupled to the second storage zone 16 via the second conveying system 15b. Orders by the intermediate trade/end seller are comprehensive and often contain many ordered goods 26a . . . 26c of the same type of good, whereas orders by the end customers are less comprehensive and contain few ordered goods 26a . . . 26c of the same type of good.

Yet, self-evidently, it would also be possible for the autonomous industrial trucks 35a . . . 35c to be used for storing goods 21a . . . 21e into the first storage zone 8 or for storing transfer goods 31 into the second storage zone 16 and/or for retrieving transfer goods 31 from the first storage zone 8 or for retrieving ordered goods 26a from the second storage zone 16. The first storage zone 8 and/or the second storage zone 16 can then be equipped with adequate transfer stations (not depicted), which enable the transfer of first loading aids 27a, 27b into the first storage zone 8, the transfer of hanging bags 29a . . . 29c into the second storage zone 16, the acceptance of first loading aids 27a, 27b from the first storage zone 8 or the acceptance of hanging bags 29a . . . 29c from the second storage zone 16.

Specifically, using the autonomous industrial truck 35c, first loading aids 27a, 27b can be retrieved from the first storage zone 8 and provisioned at the first reloading provisioning position 14 and/or first loading aids 27a, 27b can be stored into the first storage zone 8. The storage and retrieval units 12a, 12b will then be obsolete. If the hanging bags 29a . . . 29c, using the autonomous industrial truck 35a . . . 35c, can be stored into the second storage zone 16, the first section 15a of the second conveying system will be obsolete. If the hanging bags 29a . . . 29c, using the autonomous industrial truck 35a . . . 35c, can be retrieved from the second storage zone 16 and transported to the picking station 24, the second section 15b of the second conveying system will be obsolete.

Figure 2:
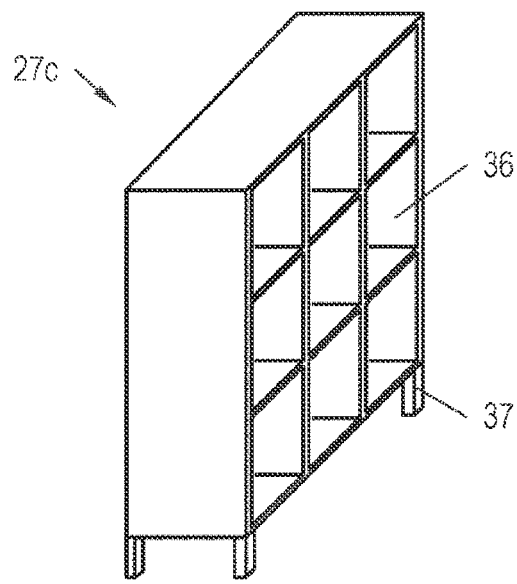
FIG. 2 an exemplary (mobile) shelf unit in an oblique view.

FIG. 2 shows an example of a first loading aid 27c, which is configured as a mobile shelf unit. The mobile shelf unit 27c comprises respectively at least one receiving location 36 in shelves located on top of one another. A plurality of goods 21a . . . 21e and/or transfer goods 31 can be placed in the mobile shelf unit 27c. In addition, the mobile shelf unit 27c has feet 37. It can therefore be lifted and transported using, for example, a fork of a forklift or of an autonomous industrial truck (see FIG. 4). It would also be conceivable that the shelf unit 27c has rollers instead of the feet 37 in order to be able to transport it more easily. It would finally also be conceivable that the shelf unit depicted in FIG. 2 is not used as a mobile shelf unit 27c but as a fixed-installation shelf unit in the first storage zone 8.

Figure 3:
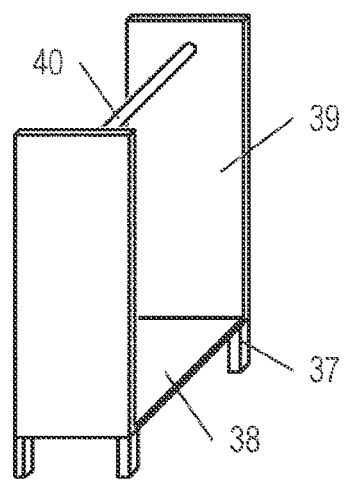
FIG. 3 an exemplary, mobile overhead storage conveyor in an oblique view and FIG. 4 an exemplary and schematically-depicted autonomous industrial truck.

Furthermore, FIG. 3 shows an exemplary configuration with a bottom 38, feet 37 arranged at same, side walls 39 rising up laterally at the bottom 38 and an overhead storage conveyor and/or suspension rod 40 arranged between the side walls.

Figure 4:
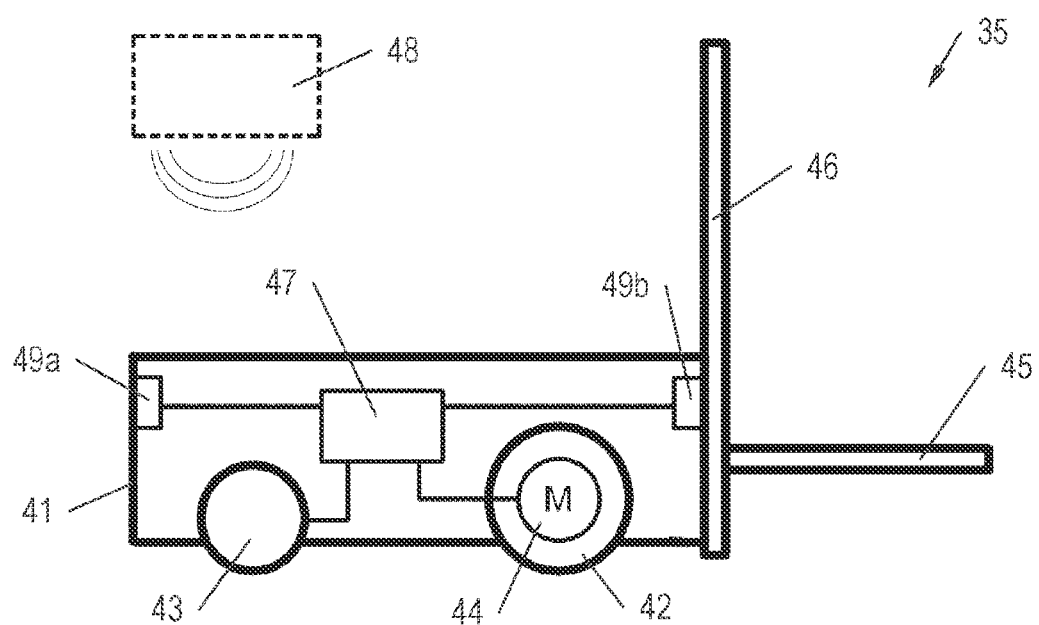

Due to the structure, the configuration depicted can be lifted and transported using, for example, a fork of a forklift or of an autonomous industrial truck (see FIG. 4). The overhead storage conveyor/suspension rod 40 is therefore configured so as to be mobile and/or transportable. It would also be conceivable that the configuration has rollers instead of the feet 37 in order to be able to transport it more easily. It would finally also be conceivable that the configuration depicted in FIG. 3 is not mobile but is installed in a fixed manner in the second storage zone 16.

FIG. 4 shows a schematically-depicted example of an autonomous industrial truck 35. The autonomous industrial truck 35 has an underframe 41, at which wheels 42, 43 are mounted so as to be rotatable. At least one of the wheels 42 is coupled with a drive 44 and at least one of the wheels 42 is steerable. According to the embodiment shown, both wheels 42 are coupled with the drive 44 and are driven by same, and both wheels 43 are steerable wheels. Yet the industrial truck 35 may also comprise only three wheels 42, 43, of which the wheels 42 are driven and the wheel 43 is steerable. In addition, the autonomous industrial truck 35 comprises a transport platform 45, on which the goods 21a . . . 21e, ordered goods 26a . . . 26c, transfer goods 31, mobile shelf units 27c or mobile overhead storage conveyors 40 to be transported can be received temporarily. According to the embodiment shown, the transport platform 45 is readjustable relative to the underframe 41. To that end, the autonomous industrial truck 35 may have a vertical guidance 46 with the vertically displaceable transport platform 45 affixed to it, as it is depicted in FIG. 4. The transport platform 45 may also be shiftable laterally and/or forward in order to be able to more easily receive or put down goods 21a . . . 21e, ordered goods 26a . . . 26c, transfer goods 31, mobile shelf units 27c or mobile overhead storage conveyors 40. Yet the transport platform 45 could also be a fixed, level surface at the autonomous industrial truck 35. Further, an autonomous industrial truck 35 also comprises a drive control 47 for receiving commands from a superordinate control 48 (which may be comprised, for example, by the warehouse computer 32 and order-processing computer 33) and for controlling/regulating the movements of the autonomous industrial truck 35. Finally, an autonomous industrial truck 35 comprises sensors 49a, 49b for capturing the environment of the autonomous industrial truck 35 and for spatial orientation. The autonomous industrial truck 35 depicted in FIG. 4 has steerable wheels 43. Yet these wheels will be obsolete to the extent that the autonomous industrial truck 35 has wheels with which also a lateral movement can be executed (e.g. Mecanum wheels). It would also be conceivable that, instead of a transport platform 45 or additionally to it, an overhead conveyor/suspension rod 40 is provided in order to retrieve ordered goods 26a from the second storage zone 16 and store transfer goods 31 into the second storage zone 16.

LIST OF REFERENCE NUMBERS 1 storage and order-picking system
2 building
3 goods acceptance zone
4 goods transfer zone
5a . . . 5b first conveying system
6a . . . 6c robot
7 first unloading provisioning position 8 first storage zone
9 second unloading provisioning position
10 third unloading provisioning position
11 storage rack
12a ... 12b storage and retrieval unit
13 unloading station
14 first reloading provisioning position
15a, 15b second conveying system
16 second storage zone
17 overhead storage conveyor
18 second reloading provisioning position
19 reloading station
20 first order-picking provisioning position
21a ... 21e good(s)
22 third conveying system
23 second order-picking provisioning position
24 picking station
25 sorting device
26a ... 26c ordered good(s)
27a ... 27c first loading aid
28 delivery goods carrier
29a ... 29c second loading aid (hanging bag)
30 target loading aid
31 transfer good(s)
32 warehouse computer
33 order-processing computer
34 joint warehouse and order-processing computer
35 ... 35c autonomous industrial truck
36 receiving location/storage location
37 foot
38 bottom
39 side wall
40 mobile overhead storage conveyor/suspension rod
41 underframe
42 wheel (driven)
43 wheel (steerable)
44 drive
45 transport platform
46 vertical guidance
47 drive control
48 superordinate control
49a, 49b sensor

The invention claimed is:

1. An order-picking method for picking at least one ordered good into or onto a target loading aid, comprising the steps
storing a plurality of goods of different types of good into a first storage zone using a plurality of loading aids, wherein the loading aids respectively receive the plurality of goods and are respectively configured so as to be different from a hanging bag,
generating a transfer request for rearranging a plurality of transfer goods of a first type of good of the different types of good from the first storage zone into a second storage zone when goods of the first type of good are low in stock in the second storage zone,
reloading the plurality of transfer goods, on the basis of the transfer request, from at least one loading aid of the plurality of loading aids into at least hanging bag, and transporting the at least one hanging bag into the second storage zone,
obtaining a picking order for picking the at least one ordered good and ascertaining the at least one ordered good required for this picking order, and
retrieving the at least one ordered good from the second storage zone and loading the at least one ordered good into or onto the target loading aid on the basis of the picking order,
wherein the transfer request is generated and executed without reference to the picking order.

2. The order-picking method according to claim 1, wherein, during the execution of the transfer request, the at least one loading aid of the plurality of loading aids is fully or partially unloaded, depending on whether a parameter which is allocated to the first type of good reaches a threshold value.

3. The order-picking method according to claim 2, wherein a probability P for a full unloading of the at least one loading aid of the plurality of loading aids fits the constraint $$P > \frac{1}{n_{Waren}}$$

wherein $n_{Waren}$ specifies the number of goods being stored in or on the at least one loading aid of the plurality of loading aids.

4. The order-picking method according to claim 2, wherein a probability P for a full unloading of each of the loading aids used for storing the line of goods of the plurality of loading aids fits the constraint $$P > \frac{n_{LHM1}}{n_{Waren}}$$

wherein $n_{LHM1}$ specifies the number of the plurality of loading aids used for storing the line of goods and $n_{Waren}$ specifies the number of goods being stored in or on the plurality of loading aids used for storing the line of goods.

5. The order-picking method according to claim 2, wherein a probability P for a full unloading of the at least one loading aid of the plurality of loading aids fits the constraint $$\frac{n_{LHM1vollst}}{n_{LHM1}} > \frac{n_{LHM1}}{n_{Waren}}$$

wherein $n_{LHM1vollst}$ specifies the number of fully unloaded first loading aids of the plurality of loading aids, $n_{LHM1}$ specifies the number of first loading aids of the plurality of loading aids involved in the transfer request of the first type of good being stored, and $n_{Waren}$ specifies the number of goods being stored in or on the loading aids involved in h transfer request of the first type of good being stored.

6. The order-picking method according to claim 2, wherein a setting to a partial or full unloading for a majority of types of good of the different types of goods of the line of goods is maintained either for a specified period of time or for a specified number of transfer requests occurring consecutively and relating to the majority of types of good subject to the setting.

7. The order-picking method according to claim 6, wherein a setting to a partial or full unloading applies to each loading aid of the plurality of loading aids required for the execution of the transfer request of the first type of good being stored.

8. The order-picking method according to claim 2, wherein a setting to a partial or full unloading for the first type of good is maintained either for a specified period of time or for a specified number of transfer requests occurring consecutively and relating to the first type of good.

9. The order-picking method according to claim 2, wherein the parameter allocated to the first type of good forms part of the group: rate of turnover of the first type of good, rate of turnover of the first type of good in the second storage zone, number of transfer goods of the first type of good to be reloaded.

10. The order-picking method according to claim 2, wherein
the parameter allocated to the first type of good is a rate of turnover of the first type of good,
the threshold value is a rate-of-turnover threshold value, which subdivides the line of goods into a share of types of good of the different types of good with a high rate of turnover and a share of types of good of the different types of good with a low rate of turnover, and
the at least one loading aid of the plurality of loading aids is fully unloaded during execution of the transfer request of the first type of good being stored if the first type of good belongs to the share of the line of goods available with a high rate of turnover which is above a rate-of-turnover threshold value.

11. The order-picking method according to claim 10, wherein the at least one loading aid of the plurality of loading aids, during execution of h transfer request of the first type of good being stored,
i) is only fully unloaded if a target number of the plurality of transfer goods to be reloaded is larger than the number, or equal to the number, of the goods located in the loading aid,
ii) is partially unloaded if a target number of the plurality of transfer goods to be reloaded is smaller than the number of the goods located in the loading aid,
if the first type of good, in the cases i) and ii), belongs to the share of the line of goods available with a low rate of turnover which is below the rate-of-turnover threshold value.

12. The order-picking method according to claim 10, wherein the number and/or target number of the plurality of transfer goods to be rearranged is determined by means of one parameter, or multiple parameters, from the group: rate of turnover of the first type of good, number of the goods of the first type of good in the second storage zone.

13. The order-picking method according to claim 2, wherein
the parameter allocated to the first type of good is a target number of transfer goods of the first type of good which is to be transferred from the first storage zone into the second storage zone,
the threshold value is a rearrangement threshold value, from which at least one loading aid loaded with goods of the first type of good of the plurality of loading aids is fully unloaded,
a target number of transfer goods of the first type of good to be reloaded is determined for the transfer request,
the actual number of the actually reloaded transfer goods corresponds to the target number if the target number is smaller, or equal to, the rearrangement threshold value and the actual number of the actually reloaded transfer goods corresponds to the total number of the goods located in the at least one loading aid of the plurality of loading aids if the target number is above the rearrangement threshold value, and at least one rearrangement threshold value $SW_{Umlager}$ referring or convertible to the actual number of goods of the actually reloaded transfer goods exists, for which the following is true:

$$SW_{Umlager} < n_{Waren} - 1$$

wherein $n_{Waren}$ specifies the number of goods of the plurality of goods respectively being stored in or on the loading aids.

14. The order-picking method according to claim 13, wherein the target number is determined by means of one parameter, or multiple parameters, from the group: rate of turnover of the first type of good, number of the goods of the first type of good in the second storage zone.

15. The order-picking method according to claim 13, wherein the rearrangement threshold value is determined by means of one parameter, or multiple parameters, from the group: rate of turnover of the first type of good, total capacity in the second storage zone, remaining capacity in the second storage zone, provisioning time during the retrieving of a transfer good of the plurality of transfer goods from the first storage zone.

16. The order-picking method according to claim 15, wherein
the rearrangement threshold value for the first type of good with a first rate of turnover is lower than for a second type of good with a smaller, second rate of turnover of the different types of goods, and/or
the rearrangement threshold value for the second storage zone with a first total capacity is lower than for the second storage zone with a smaller, second total capacity, and/or
the rearrangement threshold value for a first remaining capacity in the second storage zone is lower than for a smaller, second remaining capacity in the second storage zone, and/or
the rearrangement threshold value for a first provisioning time during the retrieving of (a) a transfer good of the plurality of transfer goods from the first storage zone is lower than for a shorter, second provisioning time during the retrieving of a transfer good of the plurality of transfer goods from the first storage zone.

17. The order-picking method according to claim 15, wherein
the rearrangement threshold value is reduced if the rate of turnover of the first type of good increases, and/or
the rearrangement threshold value is reduced if the remaining capacity in the second storage zone increases, and/or
the rearrangement threshold value is reduced if the provisioning time during the retrieving of a transfer good of the plurality of transfer goods from the first storage zone increases,
and vice versa.

18. The order-picking method according to claim 1, wherein the at least one loading aid with the plurality of transfer goods of the plurality of loading aids is conveyed from the first storage zone to a reloading station and provided at a first reloading provisioning position of the reloading station on the basis of the transfer request, and afterwards the plurality of transfer goods are is reloaded into the at least one hanging bag provided at a second reloading provisioning position of the reloading station.

19. The order-picking method according to claim 1, wherein the transfer request for rearranging the plurality of transfer goods of the first type of good from at least one loading aid of the plurality of loading aids into the at least one hanging bag is created when the number of the goods of the first type of good in the second storage zone falls below a stock threshold value.

20. The order-picking method according to claim 1, wherein, during execution of the transfer request, the content of the at least one loading aid of the plurality of loading aids is separated into multiple hanging bags.

21. The order-picking method according to claim 1, wherein, during the execution of a transfer request, one piece of the plurality of transfer goods is respectively reloaded into one hanging bag each of the at least one hanging bag.

22. The order-picking method according to claim 1, wherein, during the execution of a transfer request, more than one transfer good of the plurality of transfer goods are respectively reloaded into one hanging bag each of the at least one hanging bag.

23. The order-picking method according to claim 1, wherein the target loading aid
- is used as a dispatch loading aid and the at least one ordered good is loaded directly from the at least one hanging bag into or onto the dispatch loading aid, or
- is used as an interim loading aid and the at least one ordered good is loaded from the at least one hanging bag into or onto the interim loading aid and then into or onto a dispatch loading aid.

24. A storage and order-picking system for picking at least one ordered good into or onto a target loading aid, comprising:
- a first storage zone for depositing a plurality of goods of different types of good using a plurality of loading aids different from hanging bags,
- a second storage zone depositing the plurality of goods of different types of good using hanging bags,
- a warehouse computer for generating a transfer request for rearranging a plurality of transfer goods of a first type of good of the different types of good from the first storage zone into the second storage zone when the goods of the first type of good are low in stock in the second storage zone,
- a first conveying system for retrieving a loading aid with the transfer goods of the plurality of loading aids from the first storage zone on the basis of the transfer request,
- a second conveying system for storing the hanging bags with the transfer goods into the second storage zone on the basis of the transfer request and for retrieving the at least one ordered good,
- a reloading station cooperating with the first conveying system and the second conveying system and the reloading station is configured to reload, on the basis of the transfer request, the transfer goods from at least one loading aid of the plurality of loading aids into at least one hanging bag of the hanging bags provided at the reloading station,
- an order-processing computer for receiving an order for picking the at least one ordered good and for ascertaining the at least one ordered good required for this the picking order,
- a picking station cooperating with the second conveying system and the picking station is configured to load, on the basis of the picking order, the at least one ordered good from the at least one hanging bag of the hanging bags into or onto a target loading aid, provided at the picking station, wherein the warehouse computer is configured to generate and execute the transfer request without reference to the picking order.

25. The storage and order-picking system according to claim 24, wherein the at least one loading aid of the plurality of loading aids is selected from the group consisting of a container, a tray, and a cardboard box, and
wherein the at least one loading aid of the plurality of loading aids comprises:
- a bottom with a receiving location on an upper side of the loading aid, at which goods of the plurality of goods, or transfer goods, can be placed, and a transport surface on a lower side of the loading aid, by which the loading aid is transportable on the first conveying system, and
- side walls rising up from the bottom.

26. The storage and order-picking system according to claim 24, wherein the at least one loading aid of the plurality of loading aids is a mobile shelf unit having, in storage planes located on top of one another, shelves with respectively at least one receiving location at which goods of the plurality of goods, or transfer goods, can be placed.

27. The storage and order-picking system according to claim 24, further comprising a sorting device cooperating with the second conveying system, wherein the sorting device is configured to bring ordered goods into a specifiable sequence.

28. The storage and order-picking system according to claim 24, wherein at least one of the first conveying system and the second conveying system comprises at least one of a fixed-installation conveying device and an autonomous industrial truck.

29. The storage and order-picking system according to claim 24, wherein
the first storage zone comprises storage racks,
storage locations are provided in the storage racks, and
the first conveying system comprises an automated conveying vehicle configured to retrieve the loading aid with the transfer goods of the plurality of loading aids.

30. The storage and order-picking system according to claim 29, wherein the first conveying system comprises:
- a first conveying section for storing at least one loading aid of the plurality of loading aids with goods into the first storage zone, and
- a second conveying section for retrieving the at least one loading aid of the plurality of loading aids with transfer goods from the first storage zone, and
wherein the automated conveying vehicle is further configured to store the loading aid with the goods into a storage location.

31. The storage and order-picking system according to claim 29, wherein the automated conveying vehicle:
- is displaceable in front of the storage locations along a rack aisle, and
- is equipped with a load handling device configured to transport at least one loading aid of the plurality of loading aids with the goods of the plurality of goods into a storage location and/or configured to transport the at least one loading aid of the plurality of loading aids with the transfer goods from a storage location, and
- is configured as at least one of a rail guided automated storage and retrieval unit and an autonomous industrial truck.

32. The storage and order-picking system according to claim 24, wherein:
each loading aid of the plurality of loading aids is a mobile shelf unit having, in storage planes located on top of one another, shelves with respectively at least one receiving location at which goods of the plurality of goods, or transfer goods, can be placed, and the first conveying system comprises an automated conveying vehicle, wherein the automated conveying vehicle is configured as an autonomous industrial truck and the mobile shelf unit is transportable by the autonomous industrial truck.

33. The storage and order-picking system according to claim 24, wherein:

the second storage zone comprises overhead storage conveyors, and the second conveying system comprises overhead transport conveyors connected to the overhead storage conveyors and configured to store the hanging bags with the transfer goods into the second storage zone and/or configured to retrieve the hanging bags with the ordered goods from the second storage zone.

34. The storage and order-picking system according to claim 24, wherein:

the second storage zone comprises overhead storage conveyors, and the second conveying system comprises an automated conveying vehicle configured to store the hanging bags with the transfer goods into the second storage zone and/or configured to retrieve the hanging bags with the ordered goods from the second storage zone.

35. The storage and order-picking system according to claim 34, wherein the automated conveying vehicle:

is displaceable in front of the storage locations along a rack aisle, and is equipped with a load handling device configured to transport the hanging bags with the transfer goods into the overhead storage conveyor and/or configured to transport the hanging bags with the ordered goods from the overhead storage conveyor, and is configured as at least one of a rail guided storage and retrieval unit and an autonomous industrial truck.

36. The storage and order-picking system according to claim 34, wherein the overhead storage conveyors comprise mobile overhead storage conveyors, and the automated conveying vehicle is configured as an autonomous industrial truck and the mobile overhead storage is conveyors are transportable by the autonomous industrial truck.

\* \* \* \* \*

UNITED STATES PATENT AND TRADEMARK OFFICE
CERTIFICATE OF CORRECTION

PATENT NO. : 11,993,459 B2  
APPLICATION NO. : 17/253181  
DATED : May 28, 2024  
INVENTOR(S) : Timothy Lindley et al.

Page 1 of 1

It is certified that error appears in the above-identified patent and that said Letters Patent is hereby corrected as shown below:

In the Claims

In Column 32, Line 54 (Line 13 of Claim 5): before "transfer" please change "h" to -- the --;

In Column 33, Line 29 (Line 3 of Claim 11): before "transfer" please change "h" to -- the --;

In Column 34, Line 38 (Line 16 of Claim 16): before "a" please delete "(a)";

In Column 34, Line 61 (Line 7 of Claim 18): before "is" please delete "are".

Signed and Sealed this  
Twenty-ninth Day of October, 2024

Katherine Kelly Vidal  
*Director of the United States Patent and Trademark Office*